United States Patent
Kolan

(10) Patent No.: US 12,284,601 B2
(45) Date of Patent: Apr. 22, 2025

(54) METHODS AND APPARATUS FOR MEDIA COMMUNICATION SERVICES USING NETWORK SLICING

(71) Applicant: Samsung Electronics Co., Ltd., Suwon-si (KR)

(72) Inventor: Prakash Kolan, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 483 days.

(21) Appl. No.: 17/845,877

(22) Filed: Jun. 21, 2022

(65) Prior Publication Data

US 2023/0007573 A1 Jan. 5, 2023

Related U.S. Application Data

(60) Provisional application No. 63/280,868, filed on Nov. 18, 2021, provisional application No. 63/217,409, filed on Jul. 1, 2021.

(51) Int. Cl.
*H04W 48/08* (2009.01)
*H04W 24/02* (2009.01)
(Continued)

(52) U.S. Cl.
CPC .......... *H04W 48/16* (2013.01); *H04W 24/02* (2013.01); *H04W 28/0268* (2013.01); *H04W 48/08* (2013.01); *H04W 72/54* (2023.01)

(58) Field of Classification Search
CPC ..... H04W 48/16; H04W 48/08; H04W 72/54; H04W 24/02; H04W 28/0268
(Continued)

(56) References Cited

U.S. PATENT DOCUMENTS

| 2020/0169221 A1 | 5/2020 | Zhu et al. |
| 2020/0169921 A1 | 5/2020 | Zhu et al. |

(Continued)

FOREIGN PATENT DOCUMENTS

| EP | 3755048 A1 | 12/2020 |
| EP | 3793136 A1 | 3/2021 |
| WO | 2020209861 A1 | 10/2020 |

OTHER PUBLICATIONS

"Network Functions Virtualisation (NFV); Management and Orchestration; Report on Architectural Options", ETSI GS NFV-IFA 009 V1.1.1 (Jul. 2016) 31 pages.
(Continued)

Primary Examiner — Ted M Wang

(57) ABSTRACT

An apparatus for an application function (AF) includes a communication interface and a processor operably coupled to the communication interface. The processor is configured to receive, via the communication interface, network slice identification and media service identification across slices for a media service. The processor is also configured to manage a service corresponding to the network slice identification to a user equipment (UE). The processor is further configured to receive, via the communication interface, expected media service policy information from the UE. In addition, the processor is configured to identify policy information corresponding to each of the slices, respectively. The processor is also configured to transmit, via the communication interface, the policy information corresponding to each of the slices, respectively.

20 Claims, 25 Drawing Sheets

(51) Int. Cl.
*H04W 28/02* (2009.01)
*H04W 48/16* (2009.01)
*H04W 72/54* (2023.01)

(58) Field of Classification Search
USPC .......................................................... 455/434
See application file for complete search history.

(56) References Cited

U.S. PATENT DOCUMENTS

| 2020/0213897 | A1  | 7/2020 | Qiao et al. |           |
|--------------|-----|--------|-------------|-----------|
| 2020/0267786 | A1* | 8/2020 | Qiao        | H04W 16/02 |
| 2021/0014780 | A1* | 1/2021 | Qiao        | H04W 80/02 |

OTHER PUBLICATIONS

3GPP TR 26.802 V17.0.0. "3rd Generation Partnership Project; Technical Specification Group Services and System Aspects; Multicast Architecture Enhancement for 5G Media Streaming (Release 17)" Jun. 2021. (82 pages).
3GPP TS 23.501 V17.5.0. "3rd Generation Partnership Project; Technical Specification Group Services and System Aspects; System architecture for the 5G System (5GS); Stage 2 (Release 17)" Jun. 2022. (210 pages).
3GPP TS 26.501 V17.2.0. "3rd Generation Partnership Project; Technical Specification Group Services and System Aspects; 5G Media Streaming (5GMS) General description and architecture (Release 17)" Jun. 2022. (118 pages).
3GPP TS 26.502 V17.1.0. "3rd Generation Partnership Project; Technical Specification Group Services and System Aspects; 5G multicast-broadcast services; Use Service architecture (Release 17)" Jun. 2022. (51 pages).
3GPP TS 26.512 V17.1.0. "3rd Generation Partnership Project; Technical Specification Group Services and System Aspects; 5G Media Streaming (5GMS); Protocols (Release 17)" Jun. 2022. (165 pages).
3GPP TR 26.803 V17.1.0. "3rd Generation Partnership Project; Technical Specification Group Services and System Aspects; Study on 5G Media Streaming Extensions for Edge Processing (Release 17)" Jun. 2021. (64 pages).
3GPP TR 26.804 V17.1.0. "3rd Generation Partnership Project; Technical Specification Group Services and System Aspects; Study on 5G media streaming extensions (Release 17)" Mar. 2022. (129 pages).
3GPP TS 28.530 V17.2.0. "3rd Generation Partnership Project; Technical Specification Group Services and System Aspects; Management and orchestration; Concepts, use cases and requirements (Release 17)" Dec. 2021. (37 pages).
3GPP TS 28.531 V17.4.0. "3rd Generation Partnership Project; Technical Specification Group Services and System Aspects; Management and orchestration; Provisioning (Release 17)" Jun. 2022. (73 pages).
3GPP TS 28.532 V17.1.0. "3rd Generation Partnership Project; Technical Specification Group Services and System Aspects; Management and orchestration; Generic management services (Release 17)" Jun. 2022. (236 pages).
3GPP TS 28.541 V17.6.0. "3rd Generation Partnership Project; Technical Specification Group Services and System Aspects; Management and orchestration; 5G Network Resource Model (NRM); Stage 2 and stage 3 (Release 17)" Mar. 2022. (30 pages).
3GPP TS 28.545 V17.0.0. "3rd Generation Partnership Project; Technical Specification Group Services and System Aspects; Management and orchestration; Fault Supervision (FS) (Release 17)" Jun. 2021. (30 pages).
3GPP TS 38.300 V17.0.0. "3rd Generation Partnership Project; Technical Specification Group Radio Access Network; NR; NR and NG-RAN Overall Description; Stage 2 (Release 17)" Mar. 2022. (204 pages).
3GPP TS 28.550 V17.1.0. "3rd Generation Partnership Project; Technical Group Services and System Aspects; Management and orchestrations; Performance assurance (Release 17)" Jun. 2022. (85 pages).
3GPP TS 23.558 V17.4.0. "3rd Generation Partnership Project; Technical Group Services and System Aspects; Architecture for enabling Edge Applications; (Release 17)" Jun. 2022. (167 pages).
International Search Report and Written Opinion issued Oct. 5, 2022 regarding International Application No. PCT/KR2022/009519, 7 pages.

\* cited by examiner

METHODS AND APPARATUS FOR MEDIA COMMUNICATION SERVICES USING NETWORK SLICING

CROSS-REFERENCE TO RELATED APPLICATION AND PRIORITY CLAIM

This application claims priority under 35 U.S.C. § 119(e) to U.S. Provisional Patent Application No. 63/217,409 filed on Jul. 1, 2021, and to U.S. Provisional Patent Application No. 63/280,868 filed on Nov. 18, 2021, which are hereby incorporated by reference in its entirety.

TECHNICAL FIELD

This disclosure relates generally to fifth generation (5G) multimedia devices and processes. More specifically, this disclosure relates to methods and apparatus for media communication services using network slicing.

BACKGROUND

Media communication services with multiple service components are being planned for deployment with the emergence of 5G network architecture. With media communication services, there are multiple service components that could otherwise be deployed as different media services, thus enabling a wide variety of complex and enhanced use cases for 5G users. Each service component may have different quality of service (QoS) and content hosting/distribution requirements. In addition, it may be required that the individual service components are synchronized so a good experience is provided to the end users.

SUMMARY

This disclosure provides a method and apparatus for media communication services using network slicing.

In a first embodiment, an apparatus for an application function (AF) includes a communication interface and a processor operably coupled to the communication interface. The processor is configured to receive, via the communication interface, network slice identification and media service identification across slices for a media service. The processor is also configured to manage a service corresponding to the network slice identification to a user equipment (UE). The processor is further configured to receive, via the communication interface, expected media service policy information from the UE. In addition, the processor is configured to identify policy information corresponding to each of the slices, respectively. The processor is also configured to transmit, via the communication interface, the policy information corresponding to each of the slices, respectively.

In a second embodiment, a method for an application function includes receiving, via a communication interface, network slice identification and media service identification across slices for a media service. The method also includes managing, using a processor operably coupled to the communication interface, a service corresponding to the network slice identification to a UE. The method further includes receiving, via the communication interface, expected media service policy information from the UE. In addition, the method includes identifying, using the processor, policy information corresponding to each of the slices, respectively. The method also includes transmitting, via the communication interface, the policy information corresponding to each of the slices to slices, respectively.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
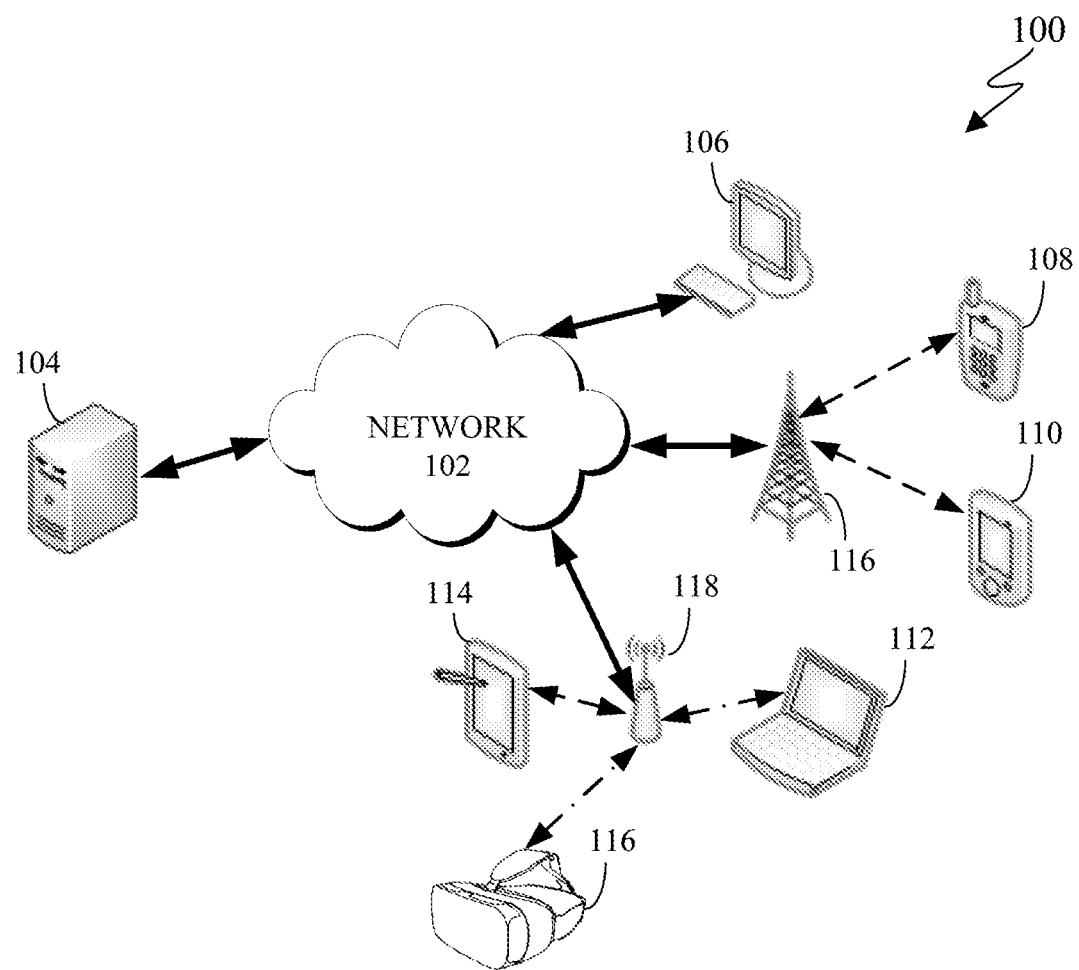
FIG. 1 illustrates an example communication system in accordance with an embodiment of this disclosure.

FIGS. 1 through 23, described below, and the various embodiments used to describe the principles of the present disclosure are by way of illustration only and should not be construed in any way to limit the scope of the disclosure. Those skilled in the art will understand that the principles of the present disclosure may be implemented in any type of suitably arranged device or system.

To meet the demand for wireless data traffic having increased since deployment of fourth generation (4G) communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, sixth generation (6G) or even later releases which may use terahertz (THz) bands.

5G enables setting up application services closer to the end user using edge computing architectures. When there is a need for relocation (e.g., when user moves to a different location, fault tolerance, etc.), the application services that were serving the user have to be relocated as well. This application covers the aspects of application service relocation for 5G multimedia edge services.

At different instances of times, depending on user demand, edge resource orchestration and scaling is performed to meet the demands for the application service. Since edge resources are usually shared by different application services and network slices, allocation and preemption of resources allocated to these application services become important. This disclosure covers the aspects of inferring optimum edge resource allocation for different edge services so resource sharing by different media application services can be optimized. In particular, this disclosure addresses prioritization of edge services by application service providers so resource allocation and preemption methods can be correctly implemented when the edge services share edge resources; defining methods for learning optimum edge resource allocation based on past allocation, current user feedback for the received service, and the currently allocated resource share; distribution and federated learning mechanisms to optimize resources allocated to an edge media service; fallback options if edge services cannot be allocated shared edge resources; and provisioning information by the application service provider to facilitate learning and inference of edge resources allocated to individual edge media services.

5G architecture is more flexible and elastic compared to the older generations of telecom networks. Due to improvements in software technologies and component hardware, complex use cases that were otherwise difficult or impossible to provide are becoming possible. These complex use cases represent high complexity media communication services that could involve multiple service components, each of which could have been a separate service by itself. Due to various requirements (quality, experience, etc.), it may be required to provide individual service components with different quality and experience. Optimization and synchronization are issues with these individual service components. How to optimize service delivery, provisioning issues are being addressed in this application.

Edge computing is fast becoming a de-facto standard for deploying high fidelity applications that require very fast throughput and low latency enabler. Services are deployed in the edge networks of mobile operators to enable users of such services to avail the benefits of high bandwidth 5G networks. Resources allocated to edge services are shared across multiple application types and services. In this context, defining priority and preemption methods becomes imperative when multiple application services are deployed in the edge network. In addition, availability of dynamic and adaptive learning mechanisms is very useful to orchestrate and scale resources in edge network for different application services. This has to be done keeping in context the performance and experience of the application service and user feedback. This disclosure covers aspects related to sharing of edge resource allocation information for different application services, and how peer edge networks can use this information to optimally allocate resources for those services in their networks.

This application covers aspects related to deployment of network slices to deliver individual components of a media communication service, slice identification across different service components for media communication service policy enforcement, and media communication service optimization using automatic enhancement of QoS parameters and offloading network slices to edge networks for compute intensive operations.

This application also describes resource allocation and scaling for edge media services based on distributed and federated learning mechanisms; using service priorities configured by application service providers to prioritize allocation and scaling of edge resources to edge services; provisioning and configuration of edge service parameters by the application service provider to facilitate learning and inferring optimum edge resource allocation in a shared edge environment; and relocation of edge media service to core network or other edge networks based on inference of resource requirements.

Improvements described in this invention include media communication service optimization using automatic enhancement of QoS parameters of network slices of individual service components to meet service quality expectations of the media communication service, dynamic policy update of individual network slices for media communication service optimization, and media communication service optimization using offloading network slice resources to edge networks.

Additional improvements described in this application include edge network service priorities provisioned by application service providers for determining priority in shared edge resource allocation and preemption; adaptive edge network resource orchestration and scaling based on user feedback and peer edge network learning of service resources; exchange of parameter collection with edge network service and resource profile information to enable optimum deployment of edge resources for different edge media services; and edge service relocation based on resource allocation inference information.

The use of computing technology for media processing is greatly expanding, largely due to the usability, convenience, computing power of computing devices, and the like. Portable electronic devices, such as laptops and mobile smart phones are becoming increasingly popular as a result of the devices becoming more compact, while the processing power and resources included a given device is increasing. Even with the increase of processing power portable electronic devices often struggle to provide the processing capabilities to handle new services and applications, as newer services and applications often require more resources that is included in a portable electronic device. Improved methods and apparatus for configuring and deploying media processing in the network is required.

Cloud media processing is gaining traction where media processing workloads are setup in the network (e.g., cloud) to take advantage of advantages of the benefits offered by the cloud such as (theoretically) infinite compute capacity, auto-scaling based on need, and on-demand processing. An end user client can request a network media processing provider for provisioning and configuration of media processing functions as required.

FIG. 1 illustrates an example communication system 100 in accordance with an embodiment of this disclosure. The embodiment of the communication system 100 shown in FIG. 1 is for illustration only. Other embodiments of the communication system 100 can be used without departing from the scope of this disclosure.

The communication system 100 includes a network 102 that facilitates communication between various components in the communication system 100. For example, the network 102 can communicate IP packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-116. The client devices 106-116 may be, for example, a smartphone, a tablet computer, a laptop, a personal computer, a wearable device, a HMD, or the like. The server 104 can represent one or more servers. Each server 104 includes any suitable computing or processing device that can provide computing services for one or more client devices, such as the client devices 106-116. Each server 104 could, for example, include one or more processing devices, one or more memories storing instructions and data, and one or more network interfaces facilitating communication over the network 102. As described in more detail below, the server 104 can receive, via the communication interface, network slice identification and media service identification across slices for a media service; manage a service corresponding to the network slice identification to a user equipment (UE); receive, via the communication interface, expected media service policy information from the UE; identify policy information corresponding to each of the slices, respectively; and transmit, via the communication interface, the policy information corresponding to each of the slices, respectively, such as a client device 106-116. In certain embodiments, each server 104 can include an encoder.

Each client device 106-116 represents any suitable computing or processing device that interacts with at least one server (such as the server 104) or other computing device(s) over the network 102. The client devices 106-116 include a desktop computer 106, a mobile telephone or mobile device 108 (such as a smartphone), a portable digital assistant (PDA) 110, a laptop computer 112, a tablet computer 114, and a head mounted device (HMD) 116. However, any other or additional client devices could be used in the communication system 100. Smartphones represent a class of mobile devices 108 that are handheld devices with mobile operating systems and integrated mobile broadband cellular network connections for voice, short message service (SMS), and Internet data communications.

In this example, some client devices 108-116 communicate indirectly with the network 102. For example, the mobile device 108 and PDA 110 communicate via one or more base stations 118, such as cellular base stations or eNodeBs (eNBs). Also, the laptop computer 112, the tablet computer 114, and the HMD 116 communicate via one or more wireless access points 120, such as IEEE 802.11 wireless access points. Note that these are for illustration only and that each client device 106-116 could communicate directly with the network 102 or indirectly with the network 102 via any suitable intermediate device(s) or network(s). In certain embodiments, the server 104 or any client device 106-116 can be used to can receive, via the communication interface, network slice identification and media service identification across slices for a media service; manage a service corresponding to the network slice identification to a user equipment (UE); receive, via the communication interface, expected media service policy information from the UE; identify policy information corresponding to each of the slices, respectively; and transmit, via the communication interface, the policy information corresponding to each of the slices, respectively such as any client device 106-116.

In certain embodiments, any of the client devices 106-114 transmit information securely and efficiently to another device, such as, for example, the server 104. Also, any of the client devices 106-116 can trigger the information transmission between itself and the server 104. Any of the client devices 106-114 can function as a virtual reality (VR) display when attached to a headset via brackets, and function similar to HMD 116. For example, the mobile device 108 when attached to a bracket system and worn over the eyes of a user can function similarly as the HMD 116. The mobile device 108 (or any other client device 106-116) can trigger the information transmission between itself and the server 104.

In certain embodiments, any of the client devices 106-116 or the server 104 can receive, via the communication interface, network slice identification and media service identification across slices for a media service; manage a service corresponding to the network slice identification to a user equipment (UE); receive, via the communication interface, expected media service policy information from the UE; identify policy information corresponding to each of the slices, respectively; and transmit, via the communication interface, the policy information corresponding to each of the slices, respectively.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration.

While FIG. 1 illustrates one operational environment in which various features disclosed in this patent document can be used, these features could be used in any other suitable system.

Figure 2:
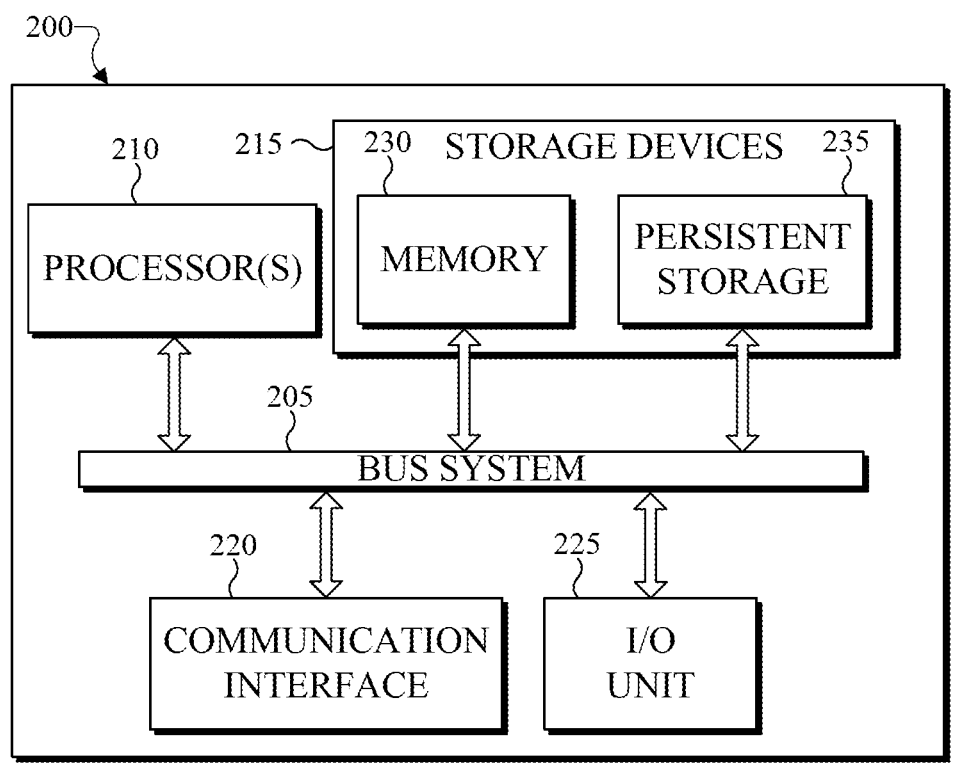
FIGS. 2 and 3 illustrate example electronic devices in accordance with an embodiment of this disclosure.
Figure 3:
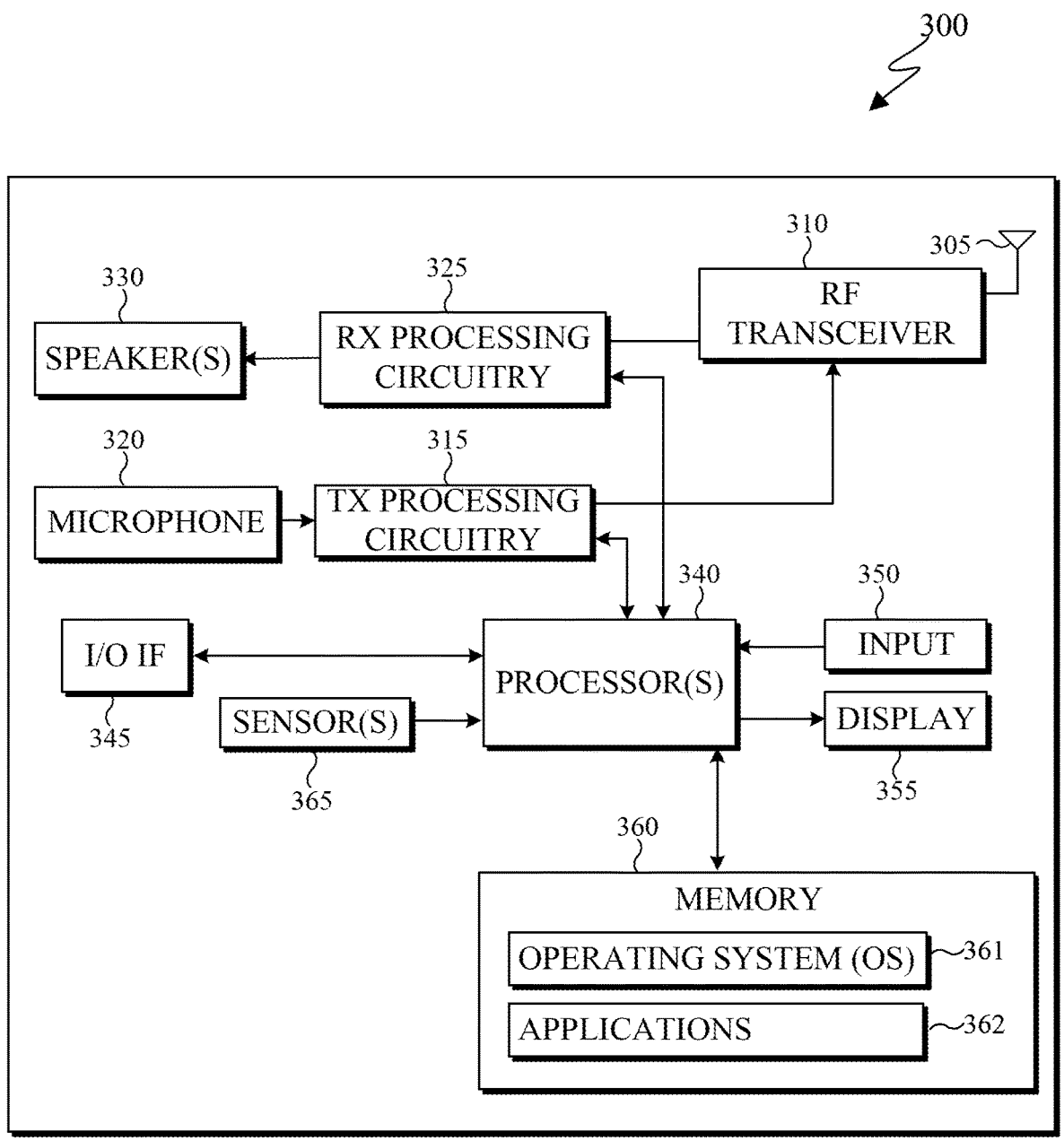

FIGS. 2 and 3 illustrate example electronic devices in accordance with an embodiment of this disclosure. In particular, FIG. 2 illustrates an example server 200, and the server 200 could represent the server 104 in FIG. 1. The server 200 can represent one or more encoders, decoders, local servers, remote servers, clustered computers, and components that act as a single pool of seamless resources, a cloud-based server, and the like. The server 200 can be accessed by one or more of the client devices 106-116 of FIG. 1 or another server.

As shown in FIG. 2, the server 200 includes a bus system 205 that supports communication between at least one processing device (such as a processor 210), at least one storage device 215, at least one communications interface 220, and at least one input/output (I/O) unit 225.

The processor 210 executes instructions that can be stored in a memory 230. The processor 210 can include any suitable number(s) and type(s) of processors or other devices in any suitable arrangement. Example types of processors 210 include microprocessors, microcontrollers, digital signal processors, field programmable gate arrays, application specific integrated circuits, and discrete circuitry.

The memory 230 and a persistent storage 235 are examples of storage devices 215 that represent any structure(s) capable of storing and facilitating retrieval of information (such as data, program code, or other suitable information on a temporary or permanent basis). The memory 230 can represent a random-access memory or any other suitable volatile or non-volatile storage device(s). The persistent storage 235 can contain one or more components or devices supporting longer-term storage of data, such as a read only memory, hard drive, Flash memory, or optical disc.

The communications interface 220 supports communications with other systems or devices. For example, the communications interface 220 could include a network interface card or a wireless transceiver facilitating communications over the network 102 of FIG. 1. The communications interface 220 can support communications through any suitable physical or wireless communication link(s).

The I/O unit 225 allows for input and output of data. For example, the I/O unit 225 can provide a connection for user input through a keyboard, mouse, keypad, touchscreen, or other suitable input device. The I/O unit 225 can also send output to a display, printer, or other suitable output device. Note, however, that the I/O unit 225 can be omitted, such as when I/O interactions with the server 200 occur via a network connection.

Note that while FIG. 2 is described as representing the server 104 of FIG. 1, the same or similar structure could be used in one or more of the various client devices 106-116. For example, a desktop computer 106 or a laptop computer 112 could have the same or similar structure as that shown in FIG. 2.

FIG. 3 illustrates an example electronic device 300, and the electronic device 300 could represent one or more of the client devices 106-116 in FIG. 1. The electronic device 300 can be a mobile communication device, such as, for example, a mobile station, a subscriber station, a wireless terminal, a desktop computer (similar to the desktop computer 106 of FIG. 1), a portable electronic device (similar to the mobile device 108, the PDA 110, the laptop computer 112, the tablet computer 114, or the HMD 116 of FIG. 1), and the like. In certain embodiments, one or more of the client devices 106-116 of FIG. 1 can include the same or similar configuration as the electronic device 300. In certain embodiments, the electronic device 300 is an encoder, a decoder, or both. For example, the electronic device 300 is usable with data transfer, image or video compression, image or video decompression, encoding, decoding, and media rendering applications.

As shown in FIG. 3, the electronic device 300 includes an antenna 305, a radio-frequency (RF) transceiver 310, transmit (TX) processing circuitry 315, a microphone 320, and receive (RX) processing circuitry 325. The RF transceiver 310 can include, for example, a RF transceiver, a BLUETOOTH transceiver, a WI-FI transceiver, a ZIGBEE transceiver, an infrared transceiver, and various other wireless communication signals. The electronic device 300 also includes a speaker 330, a processor 340, an input/output (I/O) interface (IF) 345, an input 350, a display 355, a memory 360, and a sensor(s) 365. The memory 360 includes an operating system (OS) 361, and one or more applications 362.

The RF transceiver 310 receives, from the antenna 305, an incoming RF signal transmitted from an access point (such as a base station, WI-FI router, or BLUETOOTH device) or other device of the network 102 (such as a WI-FI, BLUETOOTH, cellular, 5G, LTE, LTE-A, WiMAX, or any other type of wireless network). The RF transceiver 310 down-converts the incoming RF signal to generate an intermediate frequency or baseband signal. The intermediate frequency or baseband signal is sent to the RX processing circuitry 325 that generates a processed baseband signal by filtering, decoding, and/or digitizing the baseband or intermediate frequency signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data from the processor 340. The outgoing baseband data can include web data, e-mail, or interactive video game data. The TX processing circuitry 315 encodes, multiplexes, and/or digitizes the outgoing baseband data to generate a processed baseband or intermediate frequency signal. The RF transceiver 310 receives the outgoing processed baseband or intermediate frequency signal from the TX processing circuitry 315 and up-converts the baseband or intermediate frequency signal to an RF signal that is transmitted via the antenna 305.

The processor 340 can include one or more processors or other processing devices. The processor 340 can execute instructions that are stored in the memory 360, such as the OS 361 in order to control the overall operation of the electronic device 300. For example, the processor 340 could control the reception of upload UL channel signals and the transmission of download DL channel signals by the RF transceiver 310, the RX processing circuitry 325, and the TX processing circuitry 315 in accordance with well-known principles. The processor 340 can include any suitable number(s) and type(s) of processors or other devices in any suitable arrangement. For example, in certain embodiments, the processor 340 includes at least one microprocessor or microcontroller. Example types of processor 340 include microprocessors, microcontrollers, digital signal processors, field programmable gate arrays, application specific integrated circuits, and discrete circuitry.

The processor 340 is also capable of executing other processes and programs resident in the memory 360, such as operations that receive and store data. The processor 340 can move data into or out of the memory 360 as required by an executing process. In certain embodiments, the processor 340 is configured to execute the one or more applications 362 based on the OS 361 or in response to signals received from external source(s) or an operator. Example, applications 362 can include an encoder, a decoder, a VR or AR application, a camera application (for still images and videos), a video phone call application, an email client, a social media client, a SMS messaging client, a virtual assistant, and the like. In certain embodiments, the processor 340 is configured to receive and transmit media content.

The processor 340 is also coupled to the I/O interface 345 that provides the electronic device 300 with the ability to connect to other devices, such as client devices 106-114. The I/O interface 345 is the communication path between these accessories and the processor 340.

The processor 340 is also coupled to the input 350 and the display 355. The operator of the electronic device 300 can use the input 350 to enter data or inputs into the electronic device 300. The input 350 can be a keyboard, touchscreen, mouse, track ball, voice input, or other device capable of acting as a user interface to allow a user in interact with the electronic device 300. For example, the input 350 can include voice recognition processing, thereby allowing a user to input a voice command. In another example, the input 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 350 can be associated with the sensor(s) 365 and/or a camera by providing additional input to the processor 340. In certain embodiments, the sensor 365 includes one or more inertial measurement units (IMUs) (such as accelerometers, gyroscope, and magnetometer), motion sensors, optical sensors, cameras, pressure sensors, heart rate sensors, altimeter, and the like. The input 350 can also include a control circuit. In the capacitive scheme, the input 350 can recognize touch or proximity.

The display 355 can be a liquid crystal display (LCD), light-emitting diode (LED) display, organic LED (OLED), active-matrix OLED (AMOLED), or other display capable of rendering text and/or graphics, such as from websites, videos, games, images, and the like. The display 355 can be sized to fit within an HMD. The display 355 can be a singular display screen or multiple display screens capable of creating a stereoscopic display. In certain embodiments, the display 355 is a heads-up display (HUD). The display 355 can display 3D objects, such as a 3D point cloud.

The memory 360 is coupled to the processor 340. Part of the memory 360 could include a RAM, and another part of the memory 360 could include a Flash memory or other ROM. The memory 360 can include persistent storage (not shown) that represents any structure(s) capable of storing and facilitating retrieval of information (such as data, program code, and/or other suitable information). The memory 360 can contain one or more components or devices supporting longer-term storage of data, such as a read only memory, hard drive, Flash memory, or optical disc. The memory 360 also can contain media content. The media content can include diverse types of media such as images, videos, three-dimensional content, VR content, AR content, 3D point clouds, and the like.

The electronic device 300 further includes one or more sensors 365 that can meter a physical quantity or detect an activation state of the electronic device 300 and convert metered or detected information into an electrical signal. For example, the sensor 365 can include one or more buttons for touch input, a camera, a gesture sensor, an IMU sensors (such as a gyroscope or gyro sensor and an accelerometer), an eye tracking sensor, an air pressure sensor, a magnetic sensor or magnetometer, a grip sensor, a proximity sensor, a color sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 365 can further include control circuits for controlling any of the sensors included therein.

The electronic device 300 can receive, via the communication interface, network slice identification and media service identification across slices for a media service; manage a service corresponding to the network slice identification to a user equipment (UE); receive, via the communication interface, expected media service policy information from the UE; identify policy information corresponding to each of the slices, respectively; and transmit, via the communication interface, the policy information corresponding to each of the slices, respectively.

Although FIGS. 2 and 3 illustrate examples of electronic devices, various changes can be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). In addition, as with computing and communication, electronic devices and servers can come in a wide variety of configurations, and FIGS. 2 and 3 do not limit this disclosure to any particular electronic device or server.

Figure 4:
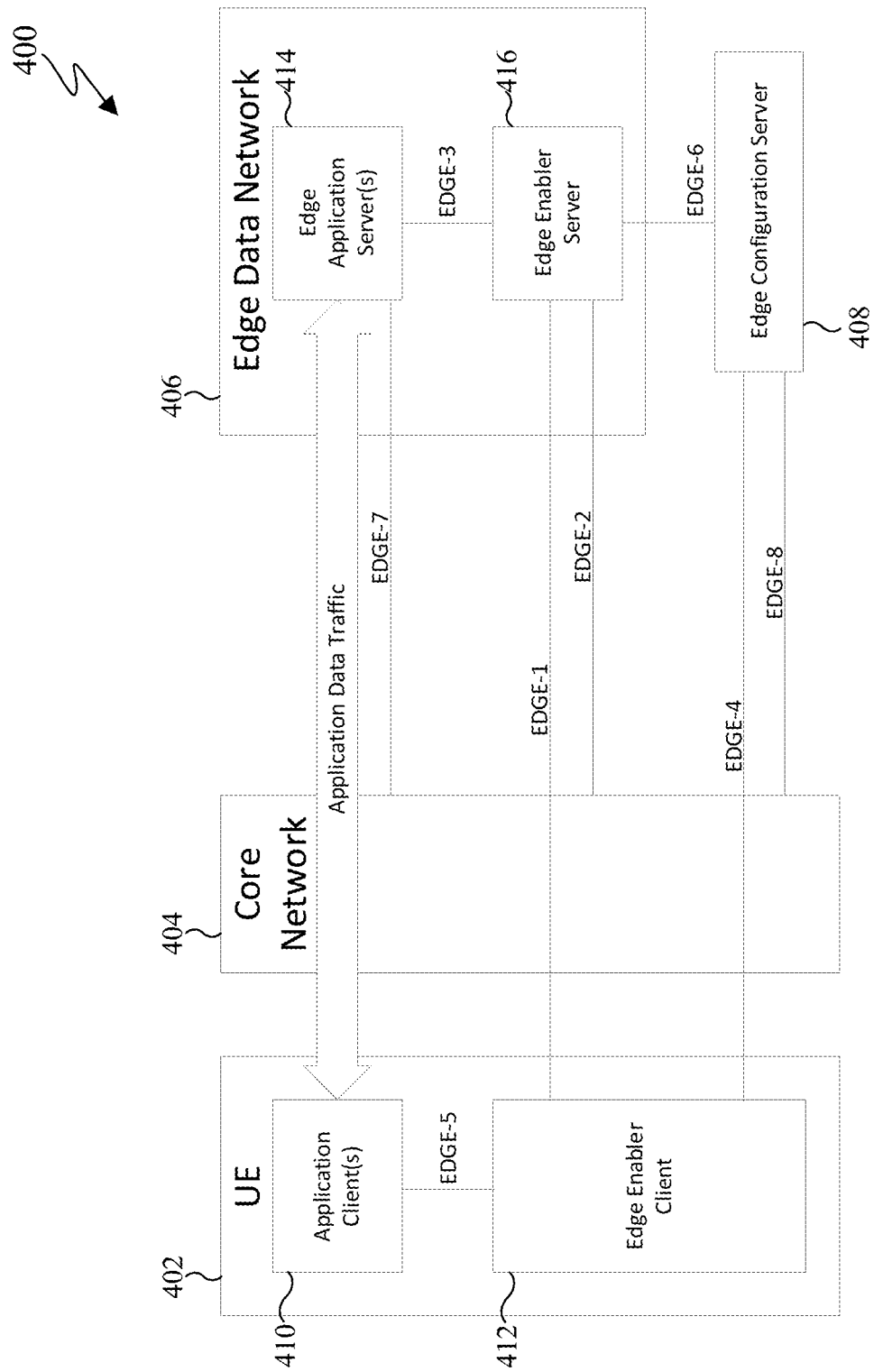
FIG. 4 illustrates an example architecture for enabling edge application in accordance with this disclosure.

FIG. 4 illustrates an example architecture 400 for enabling edge application in accordance with this disclosure. The embodiment of the edge application architecture 400 illustrated in FIG. 4 is for illustration only. FIG. 4 does not limit the scope of this disclosure to any particular implementation of an electronic device.

As shown in FIG. 4, the edge application architecture 400 includes network components 402-408 and interfaces 410-416 between those network components that can offer edge-based applications. The network components 402-408 can include a user equipment (UE) 402, a core network 404, an edge network 406, and an edge configuration server (ECS) 408. The interfaces 410-416 can include an application client 410, an edge enabler client 412, an edge application server 414, and an edge enabler server (EES) 416.

The UE 402 is a device that generates volumetric content related to a user and transmits the volumetric content to the edge network. The UE 402 receives mixed volumetric content of other users in a conference setting and renders the volumetric content in the conference setting. The UE 402 can include the application client 410 and the edge enabler client 412.

The core network 404 can assign the UE 402 to a specific node in the edge network 406. The core network 404 can direct volumetric content from the UE 402 and other UE to an edge network 406.

The edge network 406 can include media resource functions that operate to process and mix the volumetric content from the UE 402 and mix the content of other UE into a conference scene that is provided back to the UE 402. The edge network 406 can include the edge application server 414 and the EES 416. A third-generation partnership project (3GPP) system architecture and services (SA2) sub working group (SWG) defines that an edge network can be implemented as a Local Area Data Network (LADN). The premise of the edge network is that it is closer to the UE, so therefore can provide services with better latency. Application services deployed within the edge network process media destined to/originating from the UE for faster application performance.

The ECS 408 is a configuration server deployed in the edge network 406 to offer services to edge enabler client 412 to discover the appropriate EES 416 and edge application servers 414. The ECS 408 provides supporting functions needed for the edge enabler client 412 to connect with an EES 416. The ECS 408 can provision of Edge configuration information to the edge enabler client 412. The configuration information can include information for the edge enabler client 412 to connect to the EES 416 and information for establishing a connection with EESs 416. The ECS 408 can support the functionalities of registration (i.e., registration, update, and de-registration) for the EES(s) 416.

The application client 410 is a client at the UE 402 (e.g., an app) that the service provider requires the users to have to use the service. The application client 410 is the application resident in the UE 402 performing client function(s).

The edge enabler client 412 is a client at the UE 402 that interfaces with services deployed at the mobile operator edge to provide required data to the application client 410. The edge enabler client 412 abstracts the delivery of data to the application client 410, so the application client 410 does not know whether the data is being retrieved through edge network 406, core network 404, or service provider network. The edge enabler client 412 can retrieve and provision configuration information to enable the exchange of application data traffic with the edge application server 414.

The edge application server 414 is an application server deployed in the edge network 406 for the mobile operator. The edge application server 414 is the application service resident in the edge network 406, performing the server functions. The application client 410 of UE 402 can connect to the edge application server 414 in order to avail the services of the application with the benefits of edge computing.

The EES 416 provides supporting functions to enable exchange of traffic between edge enabler client 412 and edge application server 414. Such functions include discovery of edge application server 414, connection management between edge enabler client 412, ECS 408, and edge application servers 414.

The EES 416 can provision configuration information to the edge enabler client 412, enabling exchange of application data traffic with the edge application server 414. The EES 416 can interact with 3GPP core network 404 for accessing the capabilities of network functions. The EES 416 can support external exposure of 3GPP network and service capabilities to the edge application server(s) 414; support functionalities of registration (i.e., registration, update, and de-registration) for the edge enabler client(s) 412 and the edge application server(s) 414; and support the functionalities of triggering the edge application server 414 instantiation on demand.

Although FIG. 4 illustrates an edge application architecture 400 for enabling edge application, various changes may be made to FIG. 4. For example, the edge application architecture 400 and its individual components can vary as needed or desired. Also, the number and placement of various components of the edge application architecture 400 can vary as needed or desired. In addition, the edge application architecture 400 may be used in any other suitable volumetric conferencing process and is not limited to the specific processes described above.

Figure 5:
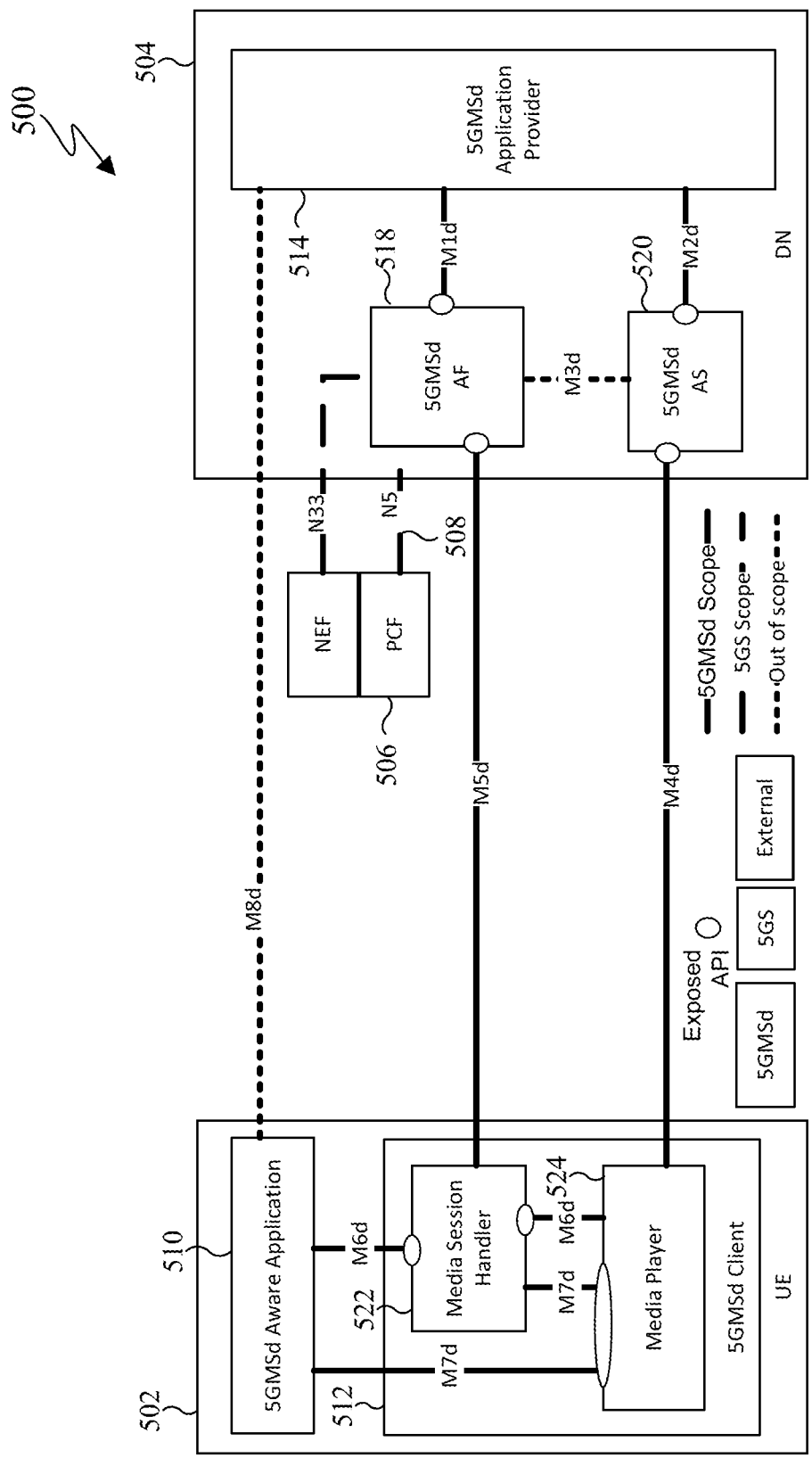
FIG. 5 illustrates an example architecture for media streaming in accordance with this disclosure.

FIG. 5 illustrates an example architecture 500 for media streaming in accordance with this disclosure. The embodiment of the media streaming architecture 500 illustrated in FIG. 5 is for illustration only. FIG. 5 does not limit the scope of this disclosure to any particular implementation of an electronic device.

5G media streaming is enabled by setting up application functions in a core network 504. A signaling application function server 518 that performs signaling function(s) and a media application function server 520 that performs media functions. There can be multiple instances of these application functions the core network 504 depending upon application requirements. Different components of UE 502 connect to these application functions to exchange signaling and media data to receive a 4G media streaming service offered by the mobile operator.

As shown in FIG. 5, 3GPP TS 26.512 specifies reference for media streaming architecture 500 for 5G media streaming (5GMS). 3GPP SA working group 4 (SA4) is standardizing media services for deployment in a 5G network. Different system components for 5G media streaming architecture 500 can include a UE 502 and a data network 504. The UE 502 can include an aware application 510, and an edge enabler client 512 (5GMSd client). The data network 504 can include an application provider 514 (5GMSd application provider), a signaling media function server 518 (5GMSd AF), and a processing media application function server (5GMSd) 520. The 5GMSd client 512 can include a media session handler 522 and a media player 524. The 5GMSd client 512 can correspond to the edge enabler client 512 shown in FIG. 5.

The aware application 510 is stored in the UE 502. The aware application 510 receives application service information from the application provider. The application service information is then used for retrieving information and data related to that application from the data network. The aware application 510 can correspond to the application client 410 shown in FIG. 4.

The signaling media function server 518 is a function in a data network 504 that performs signaling functions of the application service. The signaling media function server 518 provides various control functions to the media session handler on the UE 502 and/or the 5GMSd application provider. The signaling media function server 518 may relay or initiate a request for different policy or charging function (PCF) 506 treatment or interact with other network functions.

The media application function server 520 is an application server that hosts media functions. The media application function server 520 is dedicated to media streaming. The media application function server 520 can stream volumetric media to the UE 502.

The media session handler 522 is a component of the UE 502 that enables communication with signaling media function server 518 in the data network 504. The communications with the signaling media function server 518 are for setting up the relevant media channels between the UE 502 and the data network 504.

The media player 524 is a component of the UE 502. The media player 524 can receive media data from the media application function in the data network 504. The media player 524 can provide data to the 5GMSd aware application 510.

Although FIG. 5 illustrates a media streaming architecture 500, various changes may be made to FIG. 5. For example, the media streaming architecture 500 and its individual components can vary as needed or desired. Also, the number and placement of various components of the media streaming architecture 500 can vary as needed or desired. In addition, the media streaming architecture 500 may be used in any other suitable media streaming process and is not limited to the specific processes described above.

Figure 6:
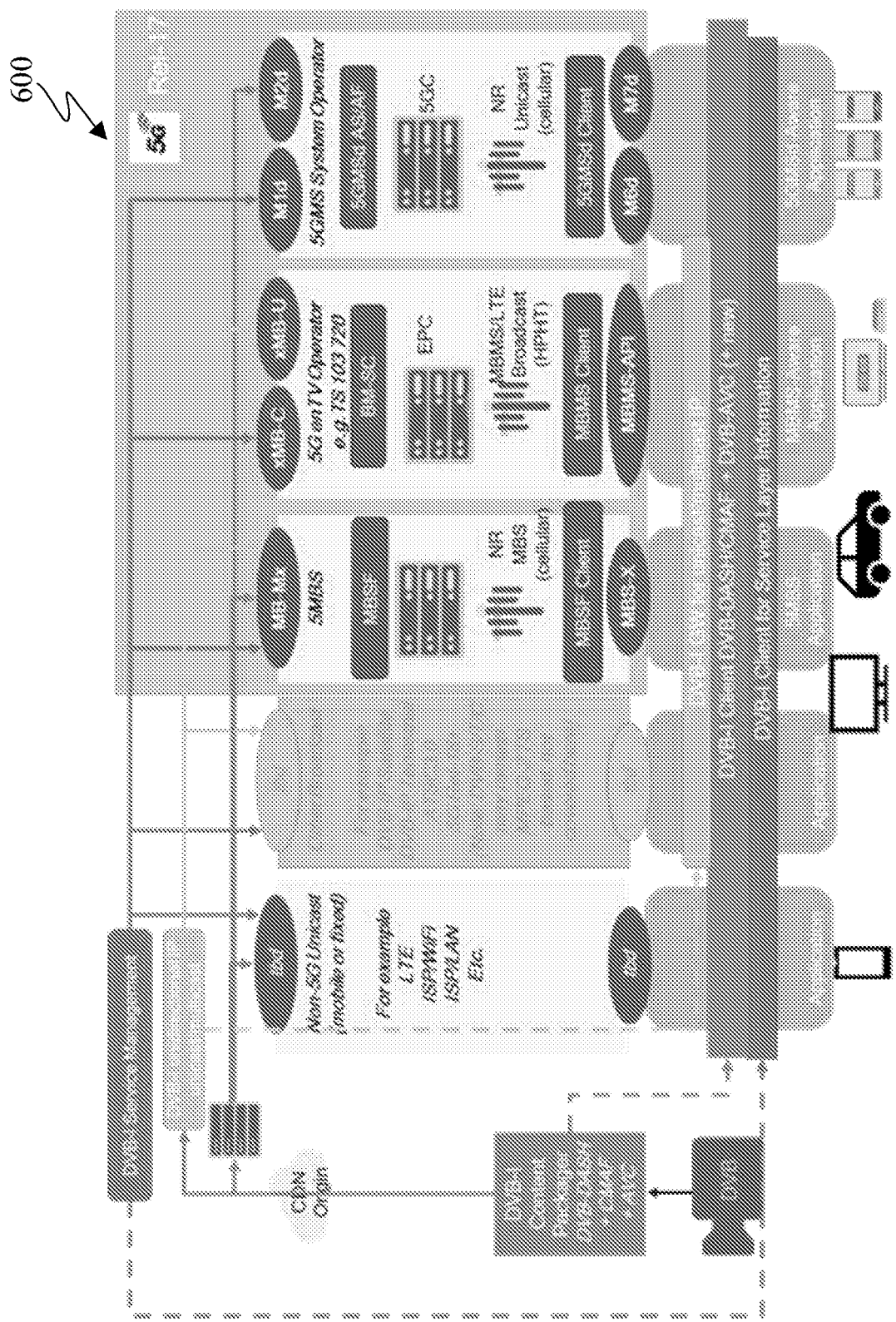
FIG. 6 illustrates an example hybrid service in accordance with this disclosure.

FIG. 6 illustrates an example hybrid service 600 in accordance with this disclosure. The embodiment of the hybrid service 600 illustrated in FIG. 6 is for illustration only. FIG. 6 does not limit the scope of this disclosure to any particular implementation of an electronic device.

As shown in FIG. 6, 3GPP SA4 SWG is studying the issue of hybrid services 600, and the preliminary specification is provided in 3GPP TR 26.802. With hybrid services delivery, the same service is available on different delivery systems, for example on multicast, on broadcast or on unicast. In addition, a service available on one delivery system may be enhanced by additional resources available on a different delivery system. Finally, a service includes sufficient information such that a client can synchronize or seamlessly replace the service on one delivery system with the one on a different one.

In addition to using different delivery systems for same service, it is also possible that an application service may need sessions that were otherwise realized as individual services. In this disclosure, these services are referred to as media communication services. A first example of a media communication service is a volumetric conversational service where users interact with volumetric contents (e.g., 3D, pointcloud, lightfield, etc.). However, the conversational service can be enhanced with streaming aspects to download/upload content between the users and the network. For example, two users communicating with each other using volumetric content, but can download/upload media content during the service for an enhanced experience. Traditionally, volumetric conversational service is a different application and download/upload streaming is a different application, but it is theoretically possible to provide both these application within the same service, so the users have an enhanced user experience with a media communication service.

A second example of a media communication service is a volumetric conversational service exists between multiple users instead of two users (e.g., conferencing service). It is possible to enhance a conferencing service with streaming aspects where the users in the conference can receive the same content using a multicast/broadcast delivery system. It is also possible that all the users in the conferencing session establish individual unicast sessions to download/upload content.

A third example of a media communication service is a simultaneous delivery using both 5G and non-3GPP access for the same service. For example, a user is using 5G download streaming to download media content sourced from an external application provider, but this service can be enhanced by allowing partial/offloaded content using non-3GPP access simultaneously. The non-3GPP access in this case could be a WIFI access or ATSC (TV broadcast) delivery systems.

Traditionally, each of the different service within the media communication service are provided to the user with a different user experience, quality, and expectation. When media communication services need to be realized it is important that methods be available to allow for synchronization of service quality and experience across multiple services that make up the media communication service. There are no solutions currently specified in standard organizations about realizing the delivery of hybrid and media communication services. In this invention, provided are technology enablers based on 5G network slicing about realizing hybrid and media communication services.

Although FIG. 6 illustrates an example hybrid service 600, various changes may be made to FIG. 6. For example, the number and placement of various components of the hybrid service 600 can vary as needed or desired. In addition, the hybrid service 600 may be used in any other suitable network slicing process and is not limited to the specific processes described above.

Figure 7A:
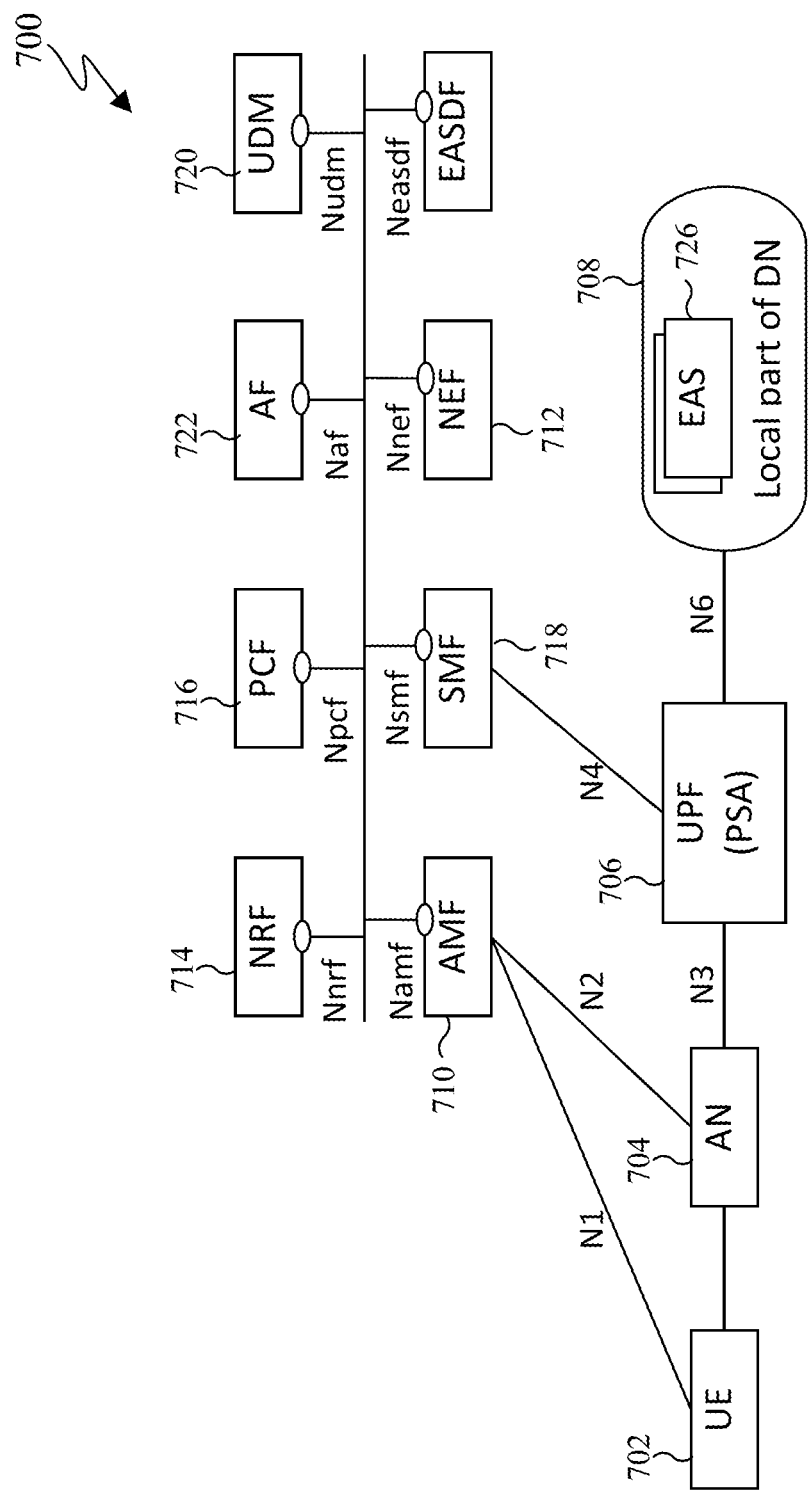
FIG. 7A illustrates a block diagram of an example architecture for accessing an edge application server in accordance with an embodiment of this disclosure.
Figure 7B:
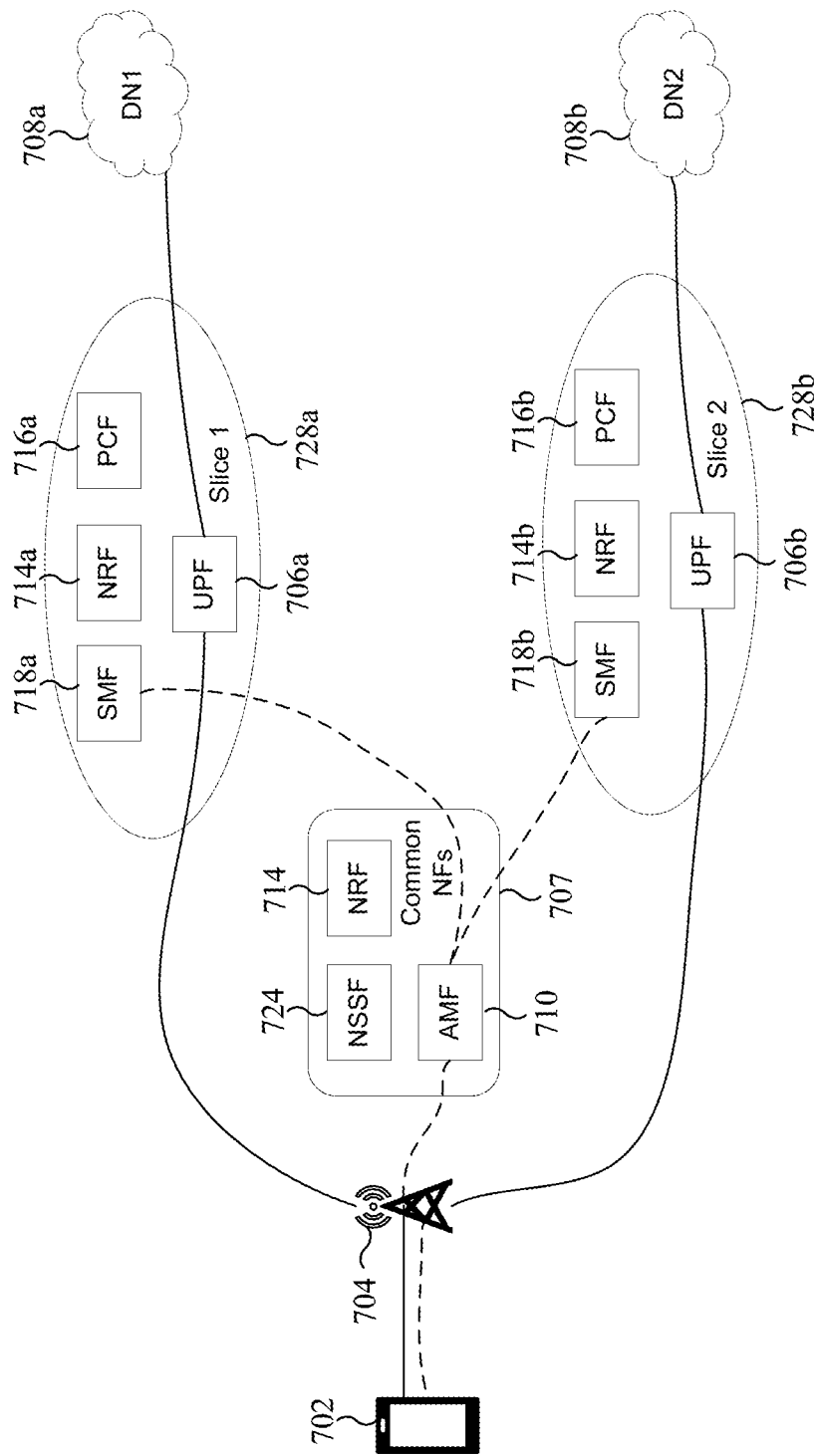
FIG. 7B illustrates a block diagram of an example schematic of 5G network slicing in accordance with an embodiment of this disclosure.

FIG. 7A illustrates a block diagram of an example architecture 700 for accessing an edge application server in accordance with an embodiment of this disclosure. FIG. 7B illustrates a block diagram of an example schematic of 5G network slicing 701 in accordance with an embodiment of this disclosure. The embodiments of the architecture 700 and the 5G network slicing 701 illustrated in FIGS. 7A and 7B are for illustration only. FIGS. 7A and 7B do not limit the scope of this disclosure to any particular implementation of an electronic device.

As shown in FIG. 7A, architecture 700 may include, as network elements, a UE 702, an access network (AN) 704, a user plane function (UPF) 706, a data network (DN) 708, and a plurality of network functions (NFs) inside a core network (CN) 707.

The plurality of NFs may include an access and mobility management function (AMF) 710, a network exposure function (NEF) 712, a network function repository function (NRF) 714, a policy control function (PCF) 716, a session management function (SMF) 718, a unified data management (UDM) 720, an application function (AF) 722, and a network slice selection function (NSSF) 724.

The UE 702 may be implemented in various forms. For example, as disclosed herein, the UE 702 may be, e.g., a mobile phone, a smartphone, a laptop computer, a digital broadcast terminal, a PDA, a portable media player (PMP), or a navigation device. As disclosed herein, the UE 702 may include an electronic device. The reference point between the UE 702 and the AMF 710 is defined as N1.

The AN 704 can represent a base station that uses a radio access technology (RAT). For example, the AN 704 may be a base station with 3GPP access technology or a base station with non-3GPP access technology, such as Wi-Fi. The reference point between the AN 704 and the AMF 710 is defined as N2, and the reference point between the AN 704 and the UPF 706 is defined as N3.

The DN 708 may deliver PDUs, which are to be sent on downlink, to the UPF 706 or receive PDUs from the UE 702 via the UPF 706. The reference point between the DN 708 and the UPF 706 is defined as N6.

The AMF 710 can provide access and mobility management functionality independently of access technology, i.e., per UE 702.

The SMF 718 can provide session management functionality in which, when one UE 702 has several sessions, a different SMF 718 can be assigned per session to manage the sessions. The UPF 706 is set up using control signal information produced by the SMF 718. The reference point between the SMF 718 and the UPF 706 is defined as N6, which is defined for the UPF 706 to be able to report its state to the SMF 718.

For example, each UE 702 may connect to one AMF 710. For the SMF 718, one UE 702 may have several sessions, and thus, a different SMF 718a or 718b may be provided for each session. To ensure QoS, the AF 722 can provide information about packet flow to the PCF 716 which is in charge of policy control.

The PCF 716 may determine policy, e.g., session management or mobility management, based on the packet flow-related information for ensuring QoS and transfer it to the AMF 710 or SMF 718, thereby enabling proper mobility management, session management, or QoS management.

A UE 702 can connect to an edge application server (EAS) 726 in an edge DN 708 using the UPF 706 that operates as a protocol data unit (PDU) session anchor (PSA). Application sessions span UE 702, the access node (e.g., the gNB) 704, UPF 706, and the EAS 726 in the edge DN 708. The UDM 720 can store user subscription data and policy data.

The CP functions may include various functions to control the core network 707 and UE 702. As two representative functions, the UE 702, the AN 704, the UPF 706, the AMF 710, the AF 722, and the DN 708 in charge of mobility management functionality and the SMF 718 in charge of session management functionality are two independent functions and they are included in the CP functions.

The mobile communication service carrier may assign network resources suited for the corresponding service per slice or per set of a particular slice. The network resources may mean NFs or logical resources, or radio resource allocations provided by the NFs.

Network slicing 701 is a technology to allow for application of such properties as network isolation, customization, and independent management and orchestration to mobile communication core network architecture by bundling network resources and network functions into a single independent slice depending on the service. Network slicing 701 is a concept for 5G core networks. Network slicing 701 is a technology that bundles network resources and network functions necessary for the service requested by the UE 702 into a single independent slice 728.

By network slicing 701, the network service provider may make independent allocations of network resources specified for each service and user and secure the flexibility of network by software defined network (SDN) and network function virtualization (NFV)-based resource virtualization and hence expandability and reliability of service and network resource operation.

The public land mobile network (PLMN) may provide several network slices 728, and each network slice may be provided to the UE in the form of a slice instance. For example, the PLMN may include a first network slice 728a, a second network slice 728b, and a third network slice 728c.

The UE 702 may access the network 707 to receive a service from at least one of the several slices 728 simultaneously or sequentially.

Each slice 728 may include network resources necessary to provide the corresponding network service. For example, a first network slice 728a may include an SMF 718a, a UPF 706a, an NRF 714a, and a PCF 716a, and a second network slice 728b may include an SMF 718b, a UPF 706b, an NRF 714b, and a PCF 716b.

Referring to FIGS. 7A and 7B, the SMF 718a of the first network slice 728a may be connected to a PCF 716 of PLMN level and the PCF 716a of the first network slice 728a. The PCF 716 of PLMN level may manage policy information about the PLMN level and provide it to the SMF 718a. The PCF 716a of the first network slice 728a may manage the policy required to provide the corresponding slice and provide the corresponding information to the SMF 718*a*.

Each slice 728 may be identified with a slice identity (ID). As an example, the slice ID may be single-network slice selection information (S-NSSI) defined by the 3GPP.

Although FIGS. 7A and 7B illustrates an example architecture 700 for accessing an edge application server 726 and network slicing 701, various changes may be made to FIGS. 7A and 7B. For example, the number and placement of various components of the example architecture 700 and network slicing 701 can vary as needed or desired. In addition, the example architecture 700 and network slicing 701 may be used in any other suitable network slicing process and is not limited to the specific processes described above.

Figure 8A:
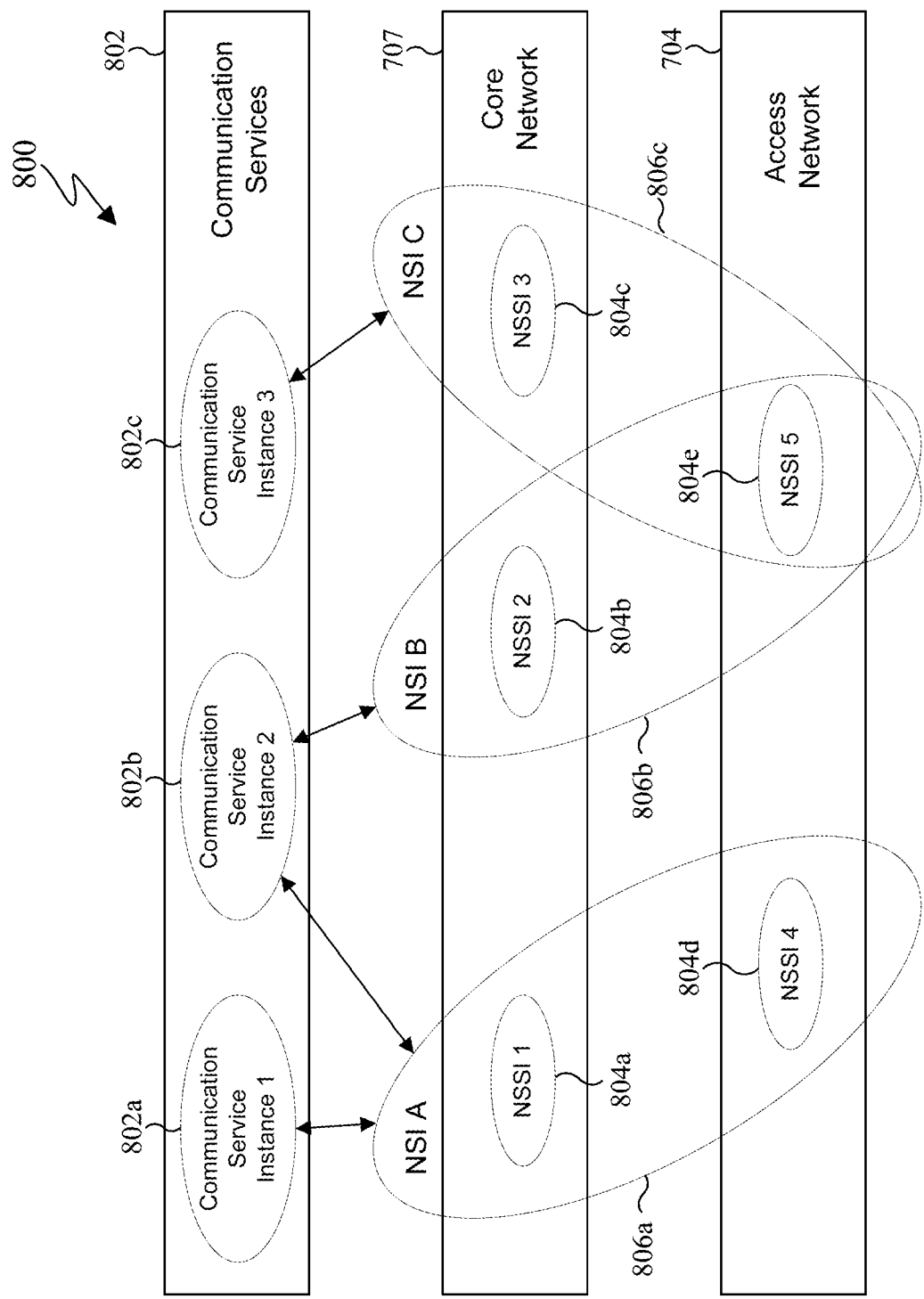
FIGS. 8A and 8B illustrates example network slicing in accordance with this disclosure.
Figure 8B:
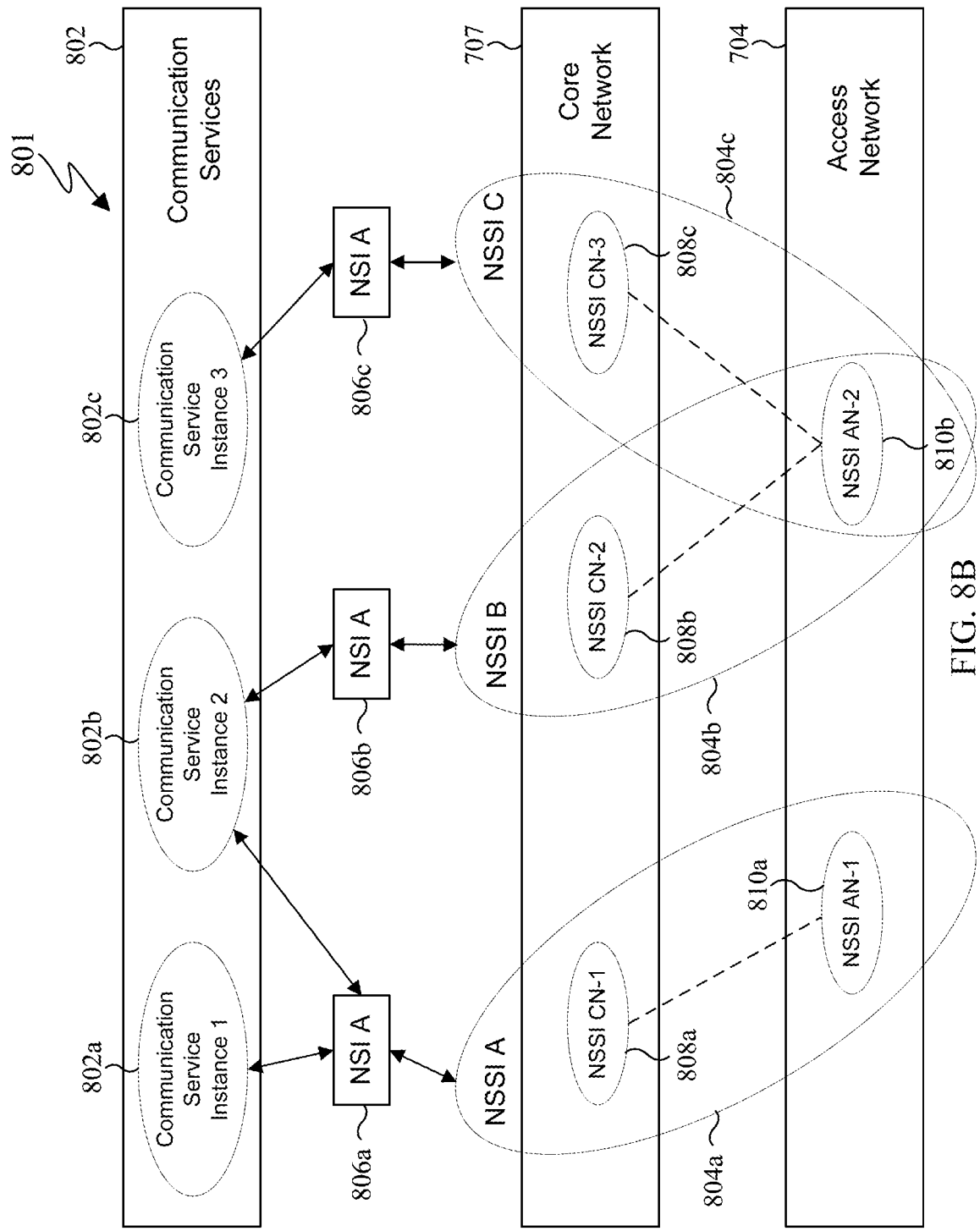

FIGS. 8A and 8B illustrate network slicing 800, 801 in accordance with this disclosure. The embodiments of the network slicing 800, 801 illustrated in FIGS. 8A and 8B are for illustration only. FIGS. 8A and 8B does not limit the scope of this disclosure to any particular implementation of an electronic device.

As shown in FIG. 8A, communication services 802 can by any of a first communication service instance 802*a*, a second communication service instance 802*b*, and a third communication service instance 802*c*. The core network 707 can include a first network slice subnet instance (NSSI) 804*a*, a second NSSI 804*b*, and a third NSSI 804*c*. The access network 704 can include a fourth NSSI 804*d* and a fifth NSSI 804*e*. The fourth NSSI 804*d* and the fifth NSSI 804*e* each contain distinct sets of NFs in the access network 704. The first NSSI 804*a*, the second NSSI 804*b*, and the third NSSI 804*c* each contain distinct sets of NFs in the core networks 707. Transport network supporting connectivity facilitates the communication between the core network 707 NFs and the access network 704 NFs. Network slice instance (NSI) A 806*a* combines the fourth NSSI 804*d* with the first NSSI 804*a* and corresponding TN connectivity. NSI B 806*b* combines the fifth NSSI 804*e* and the second NSSI 804*b* and corresponding TN connectivity. NSI C 806*c* combines fifth NSSI 804*e* with the third NSSI 804*c* and corresponding TN connectivity. The fifth NSSI 804*e* is shared between NSI B 806*b* and NSI C 806*c*, while the fourth NSSI 804*d* is dedicated to NSI A 806*a*.

Network operators (NOP) offers NSI A 806*a* as a network slice A, in this relationship network slice A represents NSI A 806*a* with associated service level specification (SLS). NOP also offers NSI B 806*b* as network slice B and NSI C 806*c* as network slice C. The SLS of network slice A satisfies the service requirements of the first communication service 802*a* and the second communication service 802*b*. The SLS of network slice B satisfies the service requirements of the second communication service 802*b*. The SLS of network slice C satisfies the service requirements of the third communication service 802*c*.

The first communication service instance 802*a* is supported by network slice A. The second communication service instance 802*b* may be supported by both network slice A and network slice B. The third communication service 802*c* is supported by network slice C.

As shown in FIG. 8B, the network slicing 801 can include communication services 802, a first network slice instance 806*a*, a second network slice instance 806*b*, a third network slice instance 806*c*, a core network 707, and an access network 704. The communication services 802 can be any of a first communication service 802*a*, a second communication service 802*b*, and a third communication service 802*c*.

The core network 707 can include a first network slice subnet instance (NSSI CN-1) 808*a*, a second NSSI CN-2 808*b*, and a third NSSI CN-3 808*c*. The access network 704 can include a first NSSI AN-1 810*a* and a second NSSI AN-2 810*b*. The first NSSI AN-1 810*a* and the second NSSI AN-2 810*b* each contain distinct sets of NFs in the access network 704. The first NSSI CN-1 808*a*, the second NSSI CN-2 808*b*, and the third NSSI CN-3 808*c* each contain distinct sets of NFs in the core networks 707. Transport network supporting connectivity facilitates the communication between the core network NFs and the access network NFs. Network slice subnet instance (NSSI) A 804*a* combines the first NSSI AN-1 810*a* with the first NSSI CN-1 808*a* and corresponding TN connectivity. The NSSI B 804*b* combines the second NSSI AN-2 810*b* and the second NSSI CN-2 808*b* and corresponding TN connectivity. The NSSI C 804*c* combines second NSSI AN-2 810*b* with the third NSSI CN-3 808*c* and corresponding TN connectivity. The second NSSI AN-2 810*b* is shared between NSSI B 804*b* and NSSI C 804*c*, while the first NSSI AN-1 810*a* is dedicated to the first NSSI A 804*a*.

Network operators (NOP) offers NSI A 806*a* as a network slice A, in this relationship network slice A represents NSI A 806*a* with associated service level specification (SLS). NOP also offers NSI B 806*b* as network slice B and NSI C 806*c* as network slice C. The SLS of network slice A satisfies the service requirements of the first communication service 802*a* and the second communication service 802*b*. The SLS of network slice B satisfies the service requirements of the second communication service 802*b*. The SLS of network slice C satisfies the service requirements of the third communication service 802*c*.

The first communication service 802*a* is supported by NSI A 806*a*. The second communication service 802*b* may be supported by either NSI A 806*a* or NSI B 806*b*. The third communication service 802*c* is supported by NSI C 806*c*.

Although FIGS. 8A and 8B illustrates a network slicing 800, 801, various changes may be made to FIGS. 8A and 8B. For example, the number and placement of various components of the network slicing 800, 801 can vary as needed or desired. In addition, the network slicing 800, 801 may be used in any other suitable network slicing process and is not limited to the specific processes described above.

Figure 9:
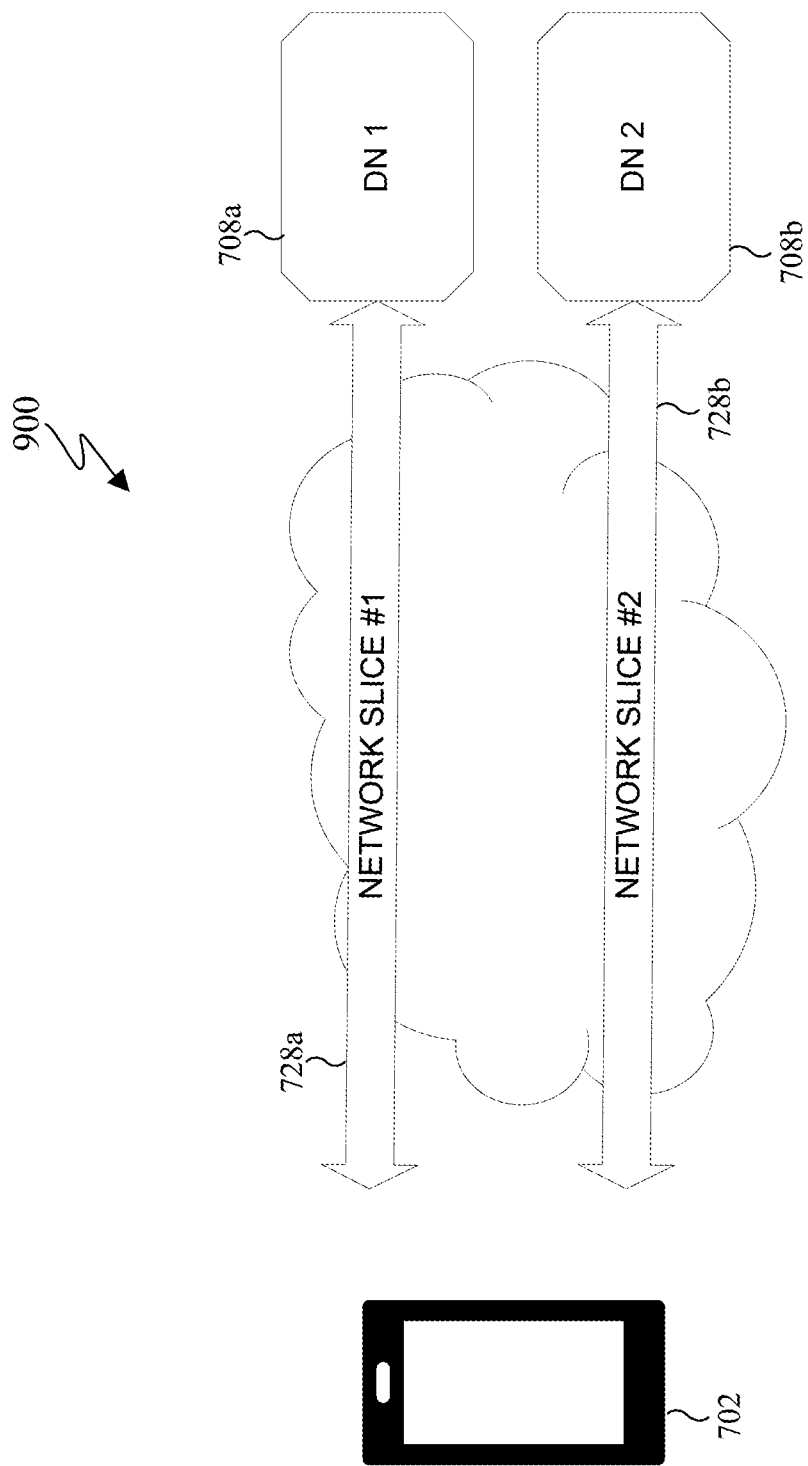
FIG. 9 illustrates an example media communication service with two network slices in accordance with this disclosure.

FIG. 9 illustrates an example media communication service 900 with two network slices 728 in accordance with this disclosure. The embodiment of the media communication service 900 illustrated in FIG. 9 is for illustration only. FIG. 9 does not limit the scope of this disclosure to any particular implementation of an electronic device.

Prior to this disclosure, there are no defined solutions for 3GPP media communication services with multiple network slices. This disclosure builds a solution for the issue of hybrid services and media communication services using network slicing.

As shown in FIG. 9, an example media communication service using two network slices 728. A first network slice 728*a* can connects to a first data network 708*a* (e.g., the 5G IMS data network) for volumetric conversational service. A second network slice 728 can connect to a different, second data network 708*b* e.g., for downloading content using 5G Media Streaming as defined in 3GPP TS 26.501 and 3GPP TS 26.502. An application in the UE 702 may use these two network slices 728 based on implementation of the application running on the UE 702. In this case, the UE application is responsible for utilizing two separate network slice connections, and then bridge (or utilize) the content retrieved using two different network slices 728. However, since the support for network slicing is not natively available from the network to the UE 702, it is entirely possible that there is a synchronization issue with content retrieved using the two different network slices 728. For example, two UEs 702 are communicating with each other using the first network slice 728*a* (volumetric conversational service). As part of the interaction, the UEs 702 can agree on viewing some content together (e.g., some 2D/3D video content, images, shared collaboration etc.) for which they use the second network slice 728*b* to retrieve the content. It is possible that since the two services are not synchronized, the content the two users are trying to retrieve using the second network slice 728*b* are not available in time. This can happen because of a) different quality parameters attributed to the second network slice 728*b* compared to the first network slice 728*a* and the second network slice 728*b*) network issues. In certain embodiments, the UE 702 can negotiate similar QoS to both of the network slices 728 so some of the problems can be alleviated. However, it is still possible that the UE initiated method of synchronizing content does not go as expected.

In above case, there is no support of the network to help synchronization of content across both network slices 728. The following network support can be added to facilitate seamless experience of hybrid and media communication services.

Network slice identifiers can be carried in signaling messages of other network slices 728 when setting up media communication services. When the first network slice 728*a* is setup, and the UE 702 and network agree on a network slice identifier (e.g., S-NSSAI of the first network slice 728*a*), then while setting up the second network slice 728*b*, the UE 702 can include the slice identifier of the first network slice 728*a* in the signaling connection for setting up the media communication using the second network slice 728*b* (e.g., using a "component slices" field). Similarly, once the second network slice 728*b* is setup, the first network slice 728*a* is updated with the slice identifier of the second network slice 728*b* so the control plane nodes of the first network slice 728*a* are aware that a corresponding network slice 728 (with slice identifier of the second network slice 728*b*) is setup.

In addition, to have the control plane nodes of all network slices 728 aware of other network slices 728 for the media communication/hybrid service, a "Media-communication-Service-Id" field can be included in all media service connection setup requests for each of the network slices 728 utilized for that media communication service. FIG. 9 shows the above steps and different signaling message fields for setting up media communication service with two network slices 728.

FIG. 9 is an example for a media communication service with two network slices 728, which can be expanded to a media communication service with any number of network slices 728. For a media communication service with "N" network slice 728, the UE 702 can perform similar action, i.e. for each subsequent connection request for the media communication service utilizing another network slice 728, the UE 702 can include a list of slice identifiers of all network slices 728 that have already been setup for the media communication service. Additionally, for each setup request for the media communication service utilizing a new network slice, the UE 702 can update already setup network slices 728 with the slice identifier of the newly setup network slice 728. In certain embodiments, when the UE 702 decides that a network slice 728 is not needed any more for the media communication service, the UE 702 can terminate the network slice 728 that is not needed, and then updates every other network slice 728 that a network slice 728 with a given slice identifier has been terminated.

The 5G AF in each network slice 728 that is responsible for serving the UE 702 is made aware of other network slices 728 in the media communication service as defined above. Once all the AFs in all the connected network slices 728 are made aware of other network slice identifiers then a common QoS and QoE framework can be implemented.

Although FIG. 9 illustrates a media communication service 900, various changes may be made to FIG. 9. For example, the sizes, shapes, and dimensions of the media communication service 900 and its individual components can vary as needed or desired. Also, the number and placement of various components of the media communication service 900 can vary as needed or desired. In addition, the media communication service 900 may be used in any other suitable network slicing process and is not limited to the specific processes described above.

Figure 10:
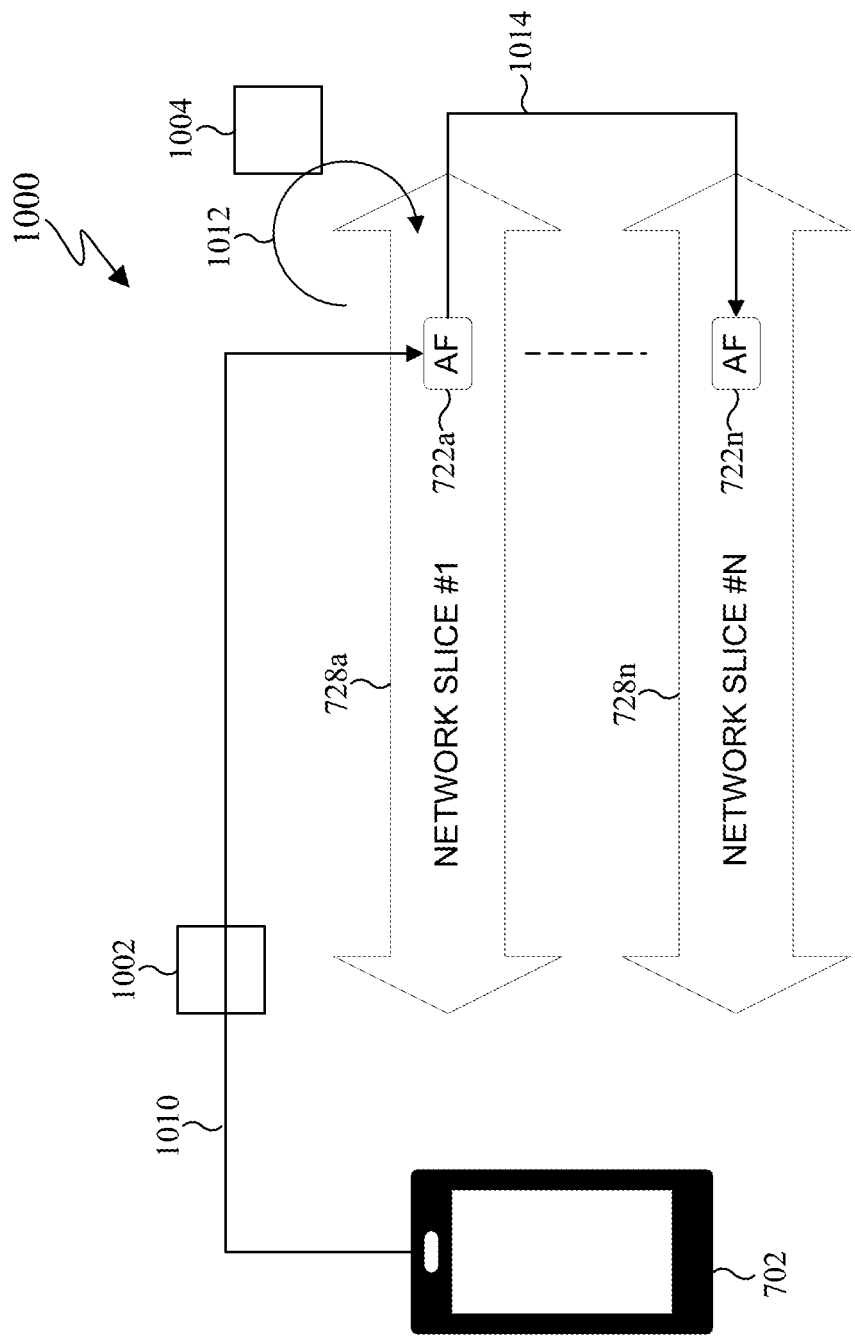
FIG. 10 illustrates a dynamic policy information derivation for each network slice in accordance with this disclosure.

FIG. 10 illustrates a dynamic policy information derivation 1000 for each network slice 728 in accordance with this disclosure. The embodiment of the dynamic policy information derivation 1000 illustrated in FIG. 10 is for illustration only. FIG. 10 does not limit the scope of this disclosure to any particular implementation of an electronic device.

As shown in FIG. 10, methods and templates are described for QoS provisioning using dynamic policy between the UE 702 and the AF 722. As specified in this disclosure, the UE 702 can create a policy template 1002 for a dynamic policy, and the AF 722 handling the session can create the necessary policy object to enforce QoS using already defined control plane procedures.

The UE 702 provided policy enforcement for media communication service can be used to define the UE-initiated update of QoS policy for the media communication service, i.e. for each different network slice 728. The UE 702 can infer the policy template 1002 and can communicate with the AF 722 of that network slice 728 to create policy instances for policing the traffic within that network slice 728. In this option, UE 702 can determine what policy templates 1002 to apply for each of the network slice connections in the media communication services.

In a network-initiated policy enforcement for media communication service, the UE 702 can rely on the network to derive a QoS policy for the media communication service. To perform this procedure, the UE 702 can select a network slice 728 and can provide an "expected-media-communication-service policy-template" 1002 that is planned for the media communication service. With the expected policy template for media communication service, the UE 702 can expect an aggregated QoS as specified in the policy template 1002 to be delivered across all network slices 728 within the media communication service.

When the AF 722 of a network slice 728 that receives the above "expected-media-communication-service-policy-template" 1002 from the UE 702 in step 1010, the AF 722 can derive the policy template information 1004 for each network slice 728 within that media communication service in step 1012.

Once a first AF 722*a* has policy template information 1004 for each network slice 728, the AF 722 can communicate with the peer AF 722 in each of the network slice 728 that is setup to realize the media communication service in step 1014. To facilitate identification of AFs 722 for other network slices 728 allocated for the media communication service, the operation of control plane function NRF can be enhanced. Alternatively, the first AF 722*a* can interface with the NSSF to retrieve the list of AF identifiers that are managing the other network slices 728 in the media communication service.

The first AF 722a in first network slice 728a that received the "expected-media-communication-service-policy-template" 1002 can pass the derived policy template information 1004 to the nth AF 722n. Once the other AFs 722 in other network slices 728 receive the policy template, each AF 722 can apply the given policy.

Although FIG. 10 illustrates a dynamic policy information derivation 1000 for each network slice 728, various changes may be made to FIG. 10. For example, the number and placement of various components of the dynamic policy information derivation 1000 can vary as needed or desired. In addition, the dynamic policy information derivation 1000 may be used in any other suitable network slicing process and is not limited to the specific processes described above.

Figure 11:
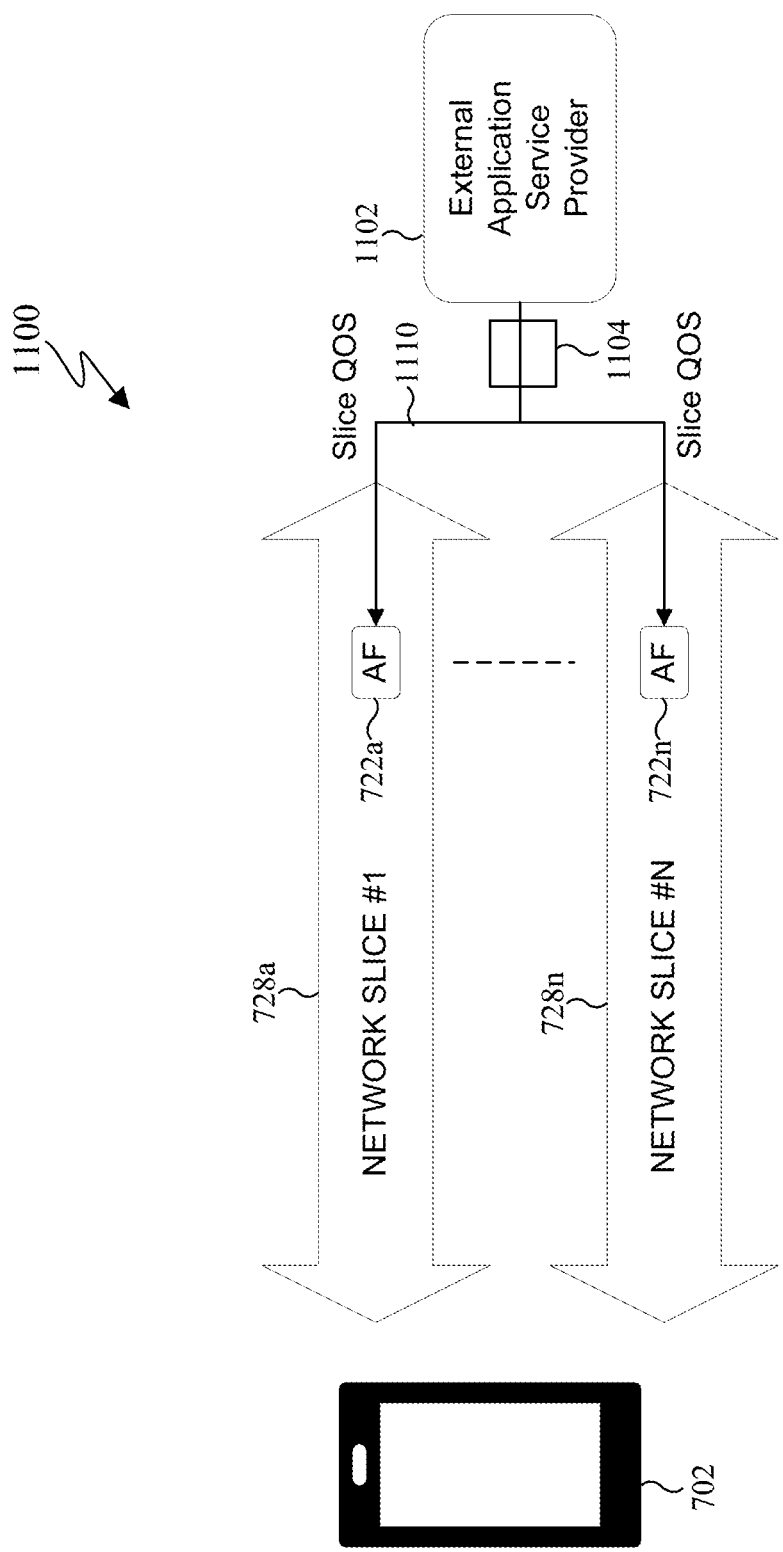
FIG. 11 illustrates a policy configuration of each network slice by an application service provider in accordance with this disclosure.

FIG. 11 illustrates a policy configuration 1100 of each network slice 728 by an application service provider 1102 in accordance with this disclosure. The embodiment of policy configuration 1100 illustrated in FIG. 11 is for illustration only. FIG. 11 does not limit the scope of this disclosure to any particular implementation of an electronic device.

As shown in FIG. 11, methods for QoS and QoE provisioning are provided for a media service. Similar to these procedures, for a media communication service with multiple network slices 728, when all the network slices 728 are setup between the UE 702 and the network, the external application service provider 1102 can negotiate each individual network slice QoS 1104 as shown. The external application provider 1102 providing media communication service to the end users can interface with AF 722 in each of the network slices 728 to provide information that has to be applied in that network slice 728 in step 1110.

Although FIG. 11 illustrates a policy configuration 1100 of each network slice 728 by an application service provider, various changes may be made to FIG. 11. For example, the number and placement of various components of the policy configuration 1100 can vary as needed or desired. In addition, the policy configuration 1100 may be used in any other suitable network slicing process and is not limited to the specific processes described above.

Figure 12:
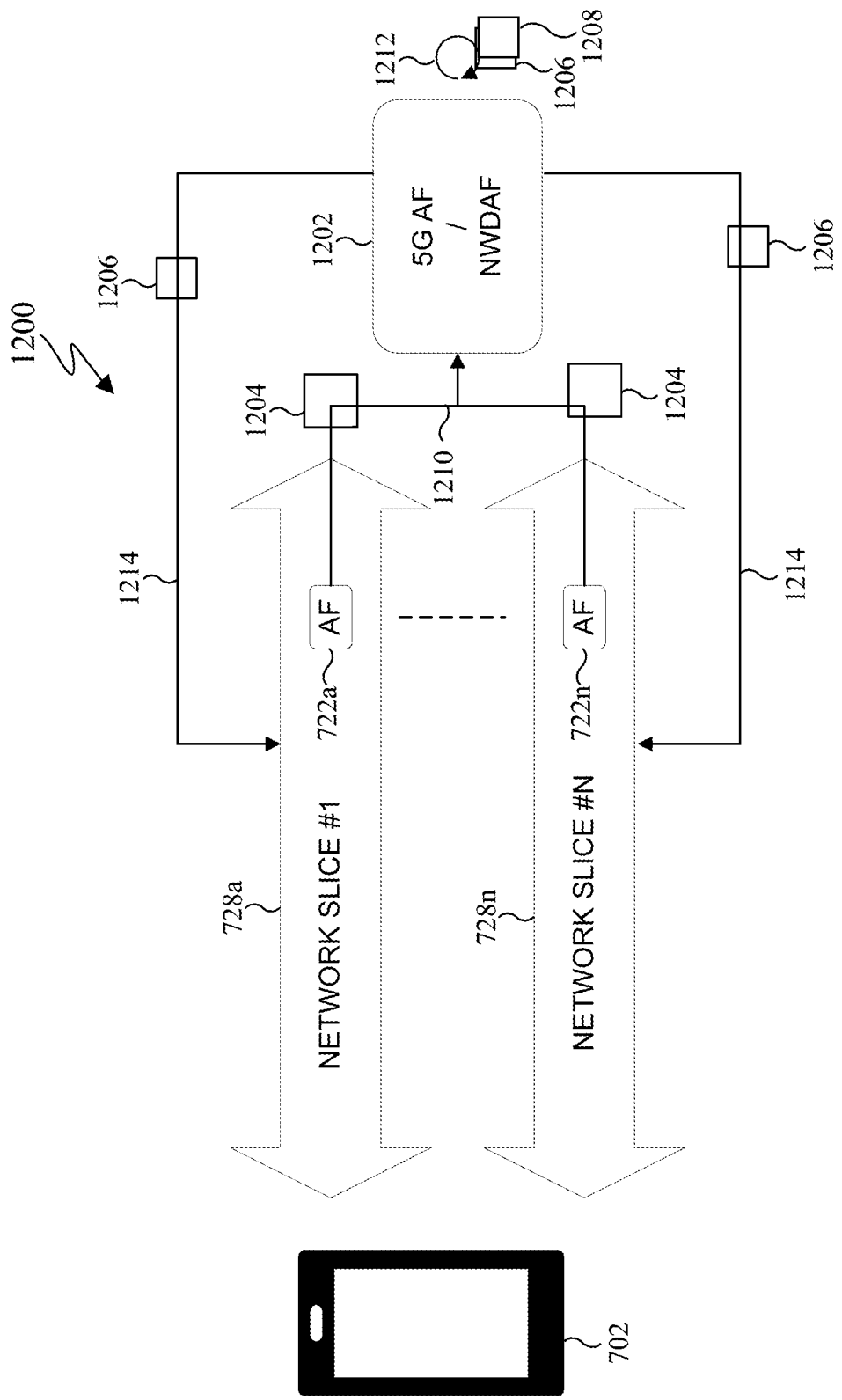
FIG. 12 illustrates an example media communication service network slice parameter optimization in accordance with this disclosure.

FIG. 12 illustrates an example media communication service network slice parameter optimization 1200 in accordance with this disclosure. The embodiment of the media communication service network slice parameter optimization 1200 illustrated in FIG. 12 is for illustration only. FIG. 12 does not limit the scope of this disclosure to any particular implementation of an electronic device.

As shown in FIG. 12, for the media communication service with multiple network slices 728 described earlier, each network slice 728 can perform differently based on provisioned QoS and network conditions. The performance of each network slice 728 can be monitored and adjusted in real time to preserve the end-to-end quality of the media communication/hybrid service.

The performance of each network slice 728 is monitored using 3GPP defined procedures. 3GPP SA2 has defined a control plane function called NWDAF 1202 that holds all network analytics data or slice metrics 1204 in step 1010. In addition, 3GPP SA5 SWG has defined the management plane function node called MDAF to monitor and gather management related data. The media communication service can be optimized by optimizing the network slice parameters 1206 of all network slices 728 that were setup for the media communication service in step 1212. The optimized slice parameters 1206 can be provided to the respective network slices 728 in step 1214.

In certain embodiments, service quality parameters 1208 can be defined for each individual network slice 728 within the media communication service in step 1212. Because of optimization of network slice parameters 1206 for each network slice 728 can be performed separately and independently, the optimization of QoS and QoE of each network slice 728 may be better or worse than another network slice 728 in the media communication service. Towards this, a quality of lower performing network slices 728 can be enhanced up to the level of higher/highest performing network slice 728. For example, if an abstract QoS score scale is defined from 0 to 1 and a media communication service has a first network slice 728a with a performance of 0.9 on the QoS score scale and an nth network slice 728n with a performance of 0.5 on the QoS score scale, the quality of the nth network slice 728n can be enhanced to the level of the first network slice 728a so both network slices 728 together can provide the aggregated end-to-end quality of media communication service. To achieve this, while the service is provisioned by the external application provider, an additional field called "enhance-to-highest-network-slice level" is defined. The semantics of "enhance-to-highest-network-slice level" field can include a Boolean variable indicating whether all network slices 728 are to be collectively enhanced to match a quality of a best performing network slice 728. The Boolean variable can be "True" to indicate that all the network slices 728 need to be enhanced to a quality of a highest performing network slice 728 and "False" to indicate that network slice parameter optimization is to be performed separately and optimization of a single network slice 728 may not affect optimization of other network slices 728.

Although FIG. 12 illustrates a media communication service network slice parameter optimization 1200, various changes may be made to FIG. 12. For example, the number and placement of various components of the media communication service network slice parameter optimization 1200 can vary as needed or desired. In addition, the media communication service network slice parameter optimization 1200 may be used in any other suitable network slicing process and is not limited to the specific processes described above.

Figure 13:
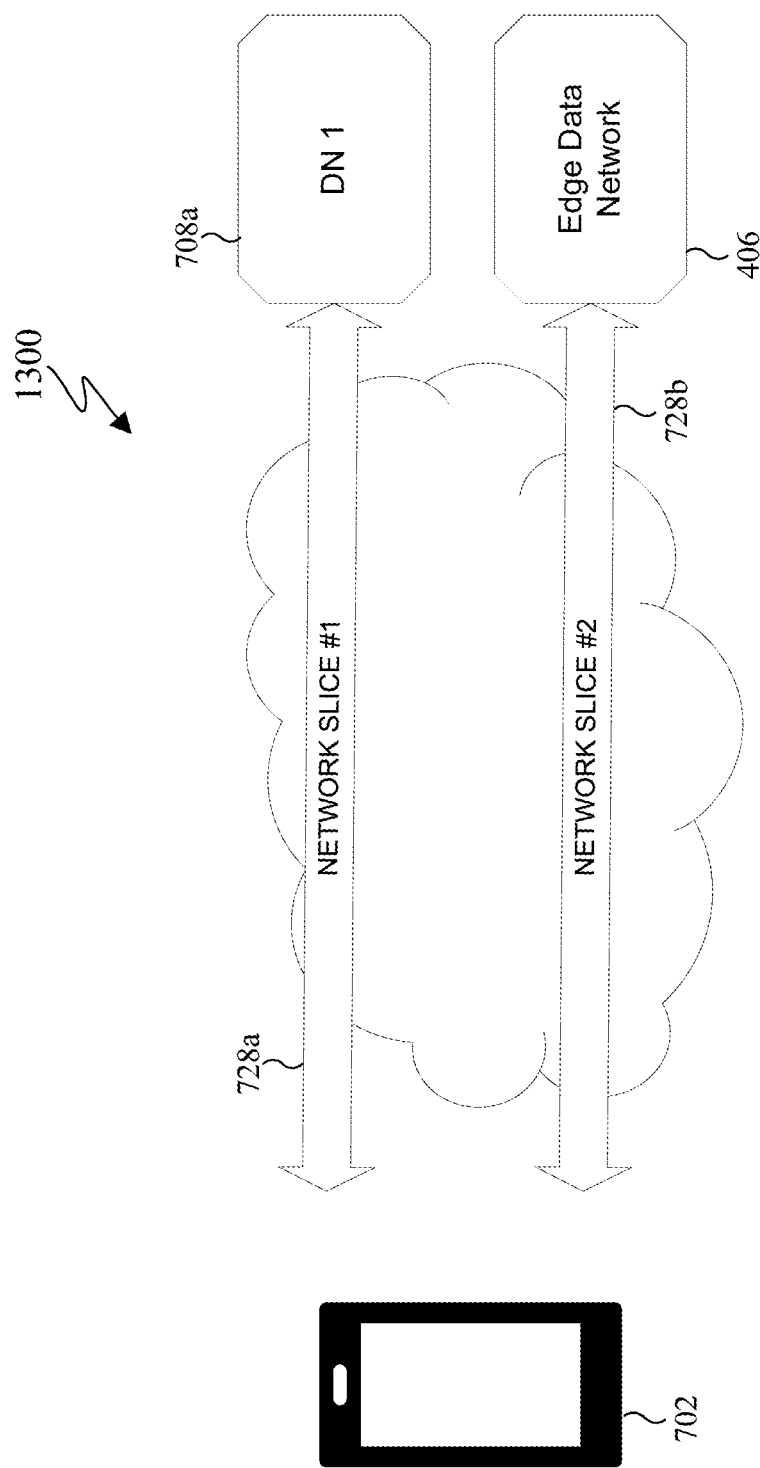
FIG. 13 illustrates an example media communication service optimization using edge computing in accordance with this disclosure.

FIG. 13 illustrates an example media communication service optimization 1300 using edge computing in accordance with this disclosure. The embodiment of the media communication service optimization 1300 illustrated in FIG. 13 is for illustration only. FIG. 13 does not limit the scope of this disclosure to any particular implementation of an electronic device.

As shown in FIG. 13, during realization of the media communication service, one or more UE 702 that are using the media communication service may see some performance artifacts that could be improved. To facilitate such improvements, performance intensive processes can be offloaded to edge networks. As such, media communication service 900 described in FIG. 9 can be realized using edge computing technology.

In certain embodiments, one of the network slices 728 (second network slice 728b for download streaming) could be setup with an edge network 406. In certain embodiments, more than one network slice 728 among all of the network slices 728 within the media communication service can be setup in one or more edge networks 406.

In an architecture realization of a media communication service, all network slices 728 to be setup as part of the media communication service can be provisioned without edge computing. During the realization of the media communication service, one or more of the UEs 702 may see performance degradation or artifacts and a decision could be made to relocate one or more of the network slices 728 to an edge network 406. The determination of which network slices 728 to be moved to edge network 406 depends on implementation of a UE 702. However, once the determination is made to relocate one or more or all network slices 728 to an edge network 406, the UE 702 can prepare a dynamic policy template 1002 with a request to move the determined network slices 728 an edge network 406. This request could be sent to the AF 722 as defined in 3GPP TS 26.501 or any of the AFs 722 discussed in this disclosure that processes such dynamic policy messages (e.g., per slice AF 722 described earlier in the disclosure, media communication AF 722 discussed in alternate embodiments, etc.). When an AF 722 determines a need to relocate certain network slices 728 to an edge network 406, the AF 722 can use the procedures described in 3GPP TR 26.803 for setting up edge application servers that meet the expectation of the QoS of the network slices 728 being moved.

For complete realization of the media communication service where in certain number of network slices 728 are relocated to edge network 406, the provisioning API between the external application service provider and the AF 722 managing the media communication service (e.g., AF 722 as defined in 3GPP TS 26.501, per slice AF 722, media communication AF 722, etc.) can be enhanced with a slice-edge-relocation field and a slice-id-list field. The slice-edge relocation field can be represented by a Boolean variable that indicates whether network slices 728 can be relocated to an edge network 406. The Boolean variable can be set to "True" to indicate that a network slice 728 can be relocated to an edge network 406 and be set to "False" to indicate that a network slice 728 cannot be relocated to an edge network 406. The slice-id-list field can be represented by a list of network slice identifiers (e.g., S-NSSAI) of network slices 728 that could be relocated to an edge network 406. The list can be a set of network slices 728 that could be relocated if the slice-edge-relocation field is enabled, i.e. set to "True".

The application service provider 1102 may provide the above information to any of the AFs 722 listed above even during the provisioning of the media communication service. When such information is obtained from the application service provider 1102 during a provisioning stage, the respective AF 722 can use this information to provision slice resources in edge network 406, if indicated.

Although FIG. 13 illustrates a media communication service optimization 1300 using edge computing, various changes may be made to FIG. 13. For example, the sizes, shapes, and dimensions of the media communication service optimization 1300 and its individual components can vary as needed or desired. Also, the number and placement of various components of the media communication service optimization 1300 can vary as needed or desired. In addition, the media communication service optimization 1300 may be used in any other suitable network slicing process and is not limited to the specific processes described above.

Figure 14:
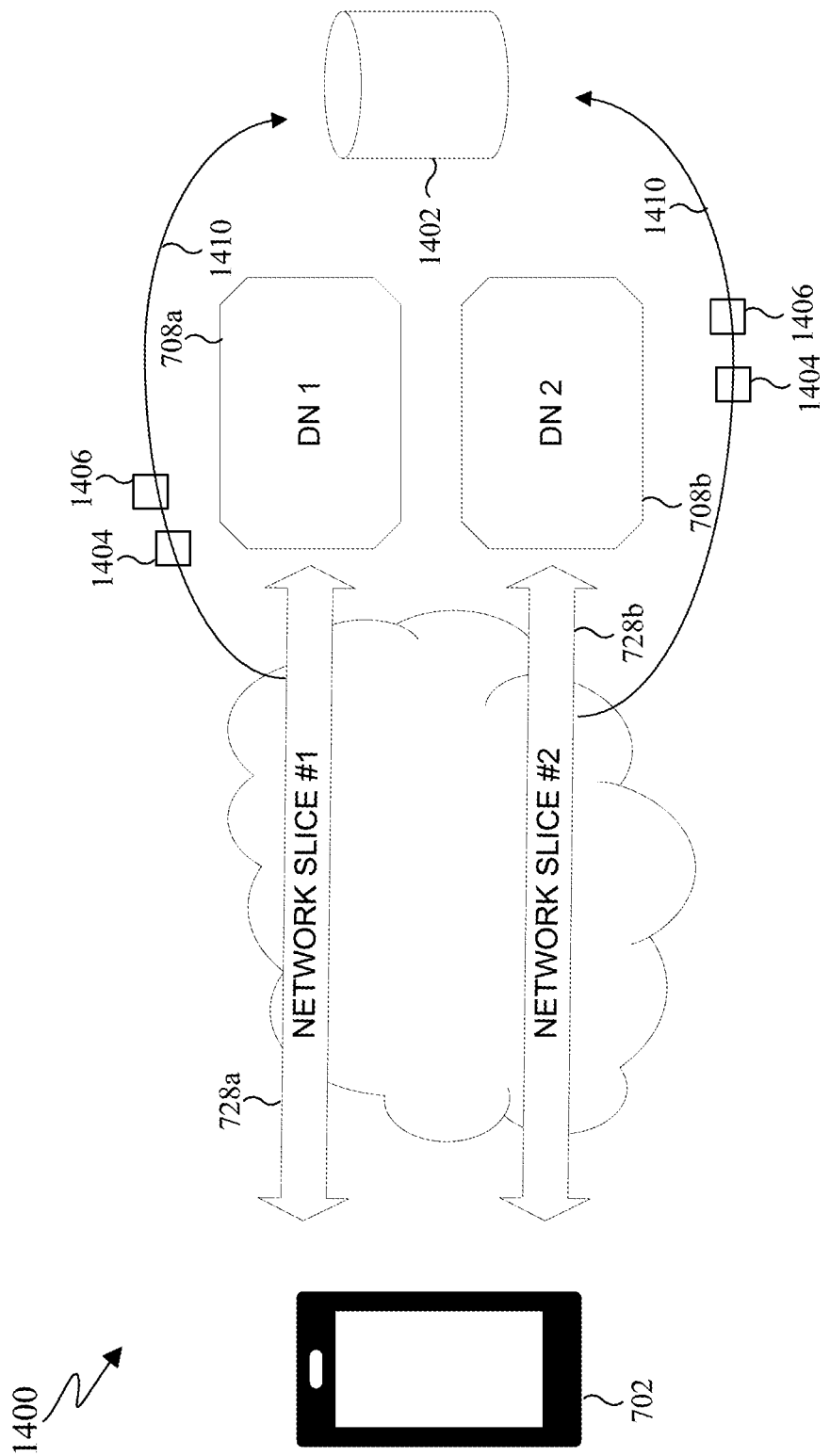
FIG. 14 illustrates an example media communication service signaling with two network slices in accordance with this disclosure.

FIG. 14 illustrates an example media communication service signaling 1400 with two network slices 728 in accordance with this disclosure. The embodiment of the media communication service signaling 1400 illustrated in FIG. 14 is for illustration only. FIG. 14 does not limit the scope of this disclosure to any particular implementation of an electronic device.

As shown in FIG. 14, a procedure is described where the UE 702 can update or inform the AFs 722 in each network slice 728 whenever a new network slice 728 is added for the media communication service. This procedure may be performance intensive for the UE 702 and the data network 708 to do this procedure for every network slice 728 that is either newly setup or terminated. In certain embodiments, a network slice directory 1402 can hold a map between the identifiers of the media communication services and currently active network slice identifiers.

In certain embodiments, for each connection management message from the UE 702, the AF 722 managing the network slice 728 in the network can update the network slice directory 1402 with the media communication service identifier 1404 and the slice identifier 1406 that is setup in step 1410. Similarly, when a network slice 728 is terminated, the AF 722 that is managing the network slice 728 can remove entry for the media communication service identifier 1404 and the slice identifier 1406 corresponding to the removed network slice 728 from the network slice directory 1402.

To support provisioning of the network slice directory 1402, the control plane function NSSF can perform the role of the network function that is managing the network slice directory 1402. Since NSSF performs active role in selection and identification of network slices 728, the NSSF and its service-based interface can be enhanced to include the API between the NSSF and network slice directory 1402.

Although FIG. 14 illustrates a media communication service signaling 1400 with two network slices 728, various changes may be made to FIG. 14. For example, the number and placement of various components of the media communication service signaling 1400 can vary as needed or desired. In addition, the media communication service signaling 1400 may be used in any other suitable network slicing process and is not limited to the specific processes described above.

Figure 15:
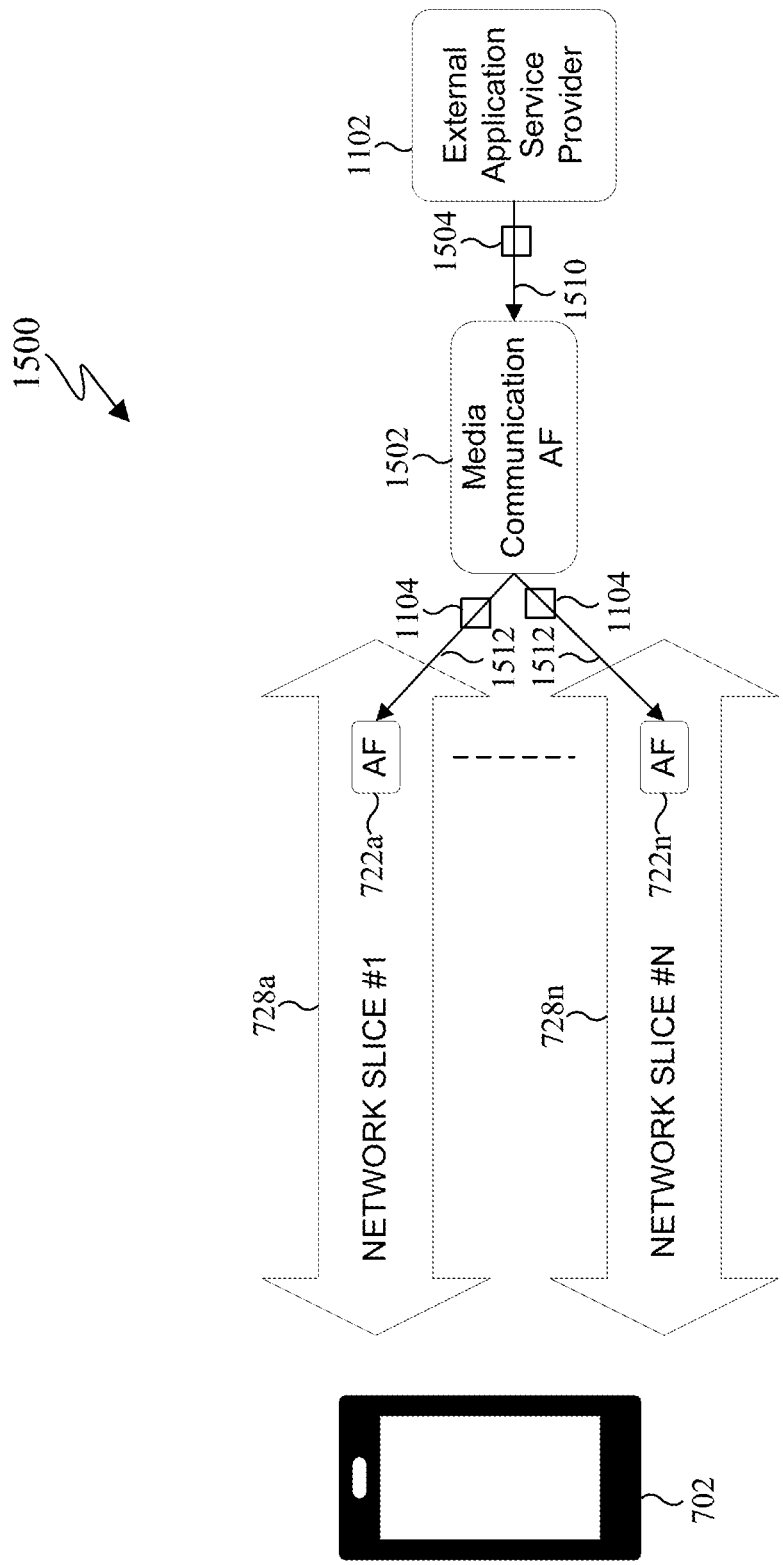
FIG. 15 illustrates an example media communication service with a singular application function in accordance with this disclosure.

FIG. 15 illustrates an example media communication service 1500 with a singular application function 722 in accordance with this disclosure. The embodiment of the media communication service 1500 illustrated in FIG. 15 is for illustration only. FIG. 15 does not limit the scope of this disclosure to any particular implementation of an electronic device.

In previous embodiments, procedures have been described where an application provider individually configures an AF 722 in each of the network slice 728 of the media communication service. Previous embodiments also described procedures for AF-to-AF interactions when the first AF 722 that receives the "expected-media-communication-service-policy-template" can derive the policy template 1002 for all other network slices 728. In certain embodiments, a procedure is provided for using a media communication application function 1502, i.e. an application function 722 for an entire media communication service 1500.

As shown in FIG. 15, a singular media communication AF 1502 can perform the role of application function 722 managing the entire media communication service 1500. In certain embodiments, the media communication AF 1502 can receive the media communication service level QoS information 1504 for media communication service from an external application service provider 1102 in step 1510. The media communication AF 1502 can break down the media communication service level QoS 1504 of media communication service to each of the network slice QoS 1104. The broken-down network slice QoS 1104 is then provided to AF 722 in each network slice 728 for application of QoS in step 1512.

Although FIG. 15 illustrates an example media communication service 1500 with a singular application function 722, various changes may be made to FIG. 15. For example, the number and placement of various components of the media communication service 1500 can vary as needed or desired. In addition, the media communication service 1500 may be used in any other suitable network slicing process and is not limited to the specific processes described above.

Figure 16:
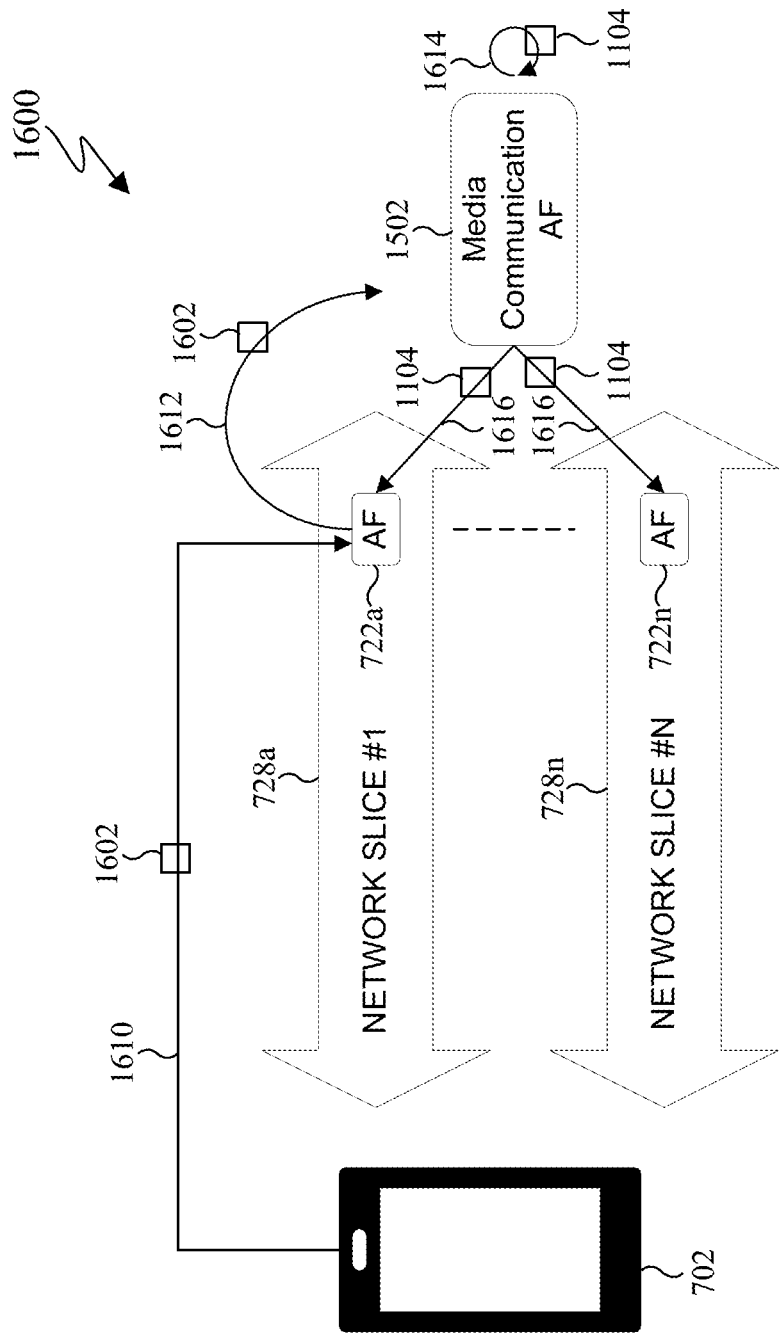
FIG. 16 illustrates an example dynamic policy for a media communication AF in accordance with this disclosure.

FIG. 16 illustrates an example dynamic policy 1600 for a media communication AF 1502 in accordance with this disclosure. The embodiment of the dynamic policy 1600 illustrated in FIG. 16 is for illustration only. FIG. 16 does not limit the scope of this disclosure to any particular implementation of an electronic device.

As shown in FIG. 16, the dynamic policy 1600 can include AF-to-AF interactions when the first AF 722*a* receives the "expected-media-communication-service-policy-template" 1602 in step 1610 and can derive the policy template 1002 for all other network slices 728. Instead of AF 722 interactions between AFs 722 of individual network slices 728, the first AF 722*a* that receives the "expected-media-communication-service-policy-template" 1602 from the UE 702 can pass this information to the media communication AF 1502 in step 1612. After receiving the "expected-media-communication-service-policy-template" 1602 from the UE 702, the media communication AF 1502 can break down that information into each individual network slice policy information or network slice QoS 1104 in step 1614. The network slice QoS 1104 is then passed to the AF 722 in each network slice 728 for QoS application in step 1616.

Although FIG. 16 illustrates an example dynamic policy 1600 for a media communication AF 1502, various changes may be made to FIG. 16. For example, the number and placement of various components of the dynamic policy 1600 can vary as needed or desired. In addition, the dynamic policy 1600 may be used in any other suitable network slicing process and is not limited to the specific processes described above.

Figure 17:
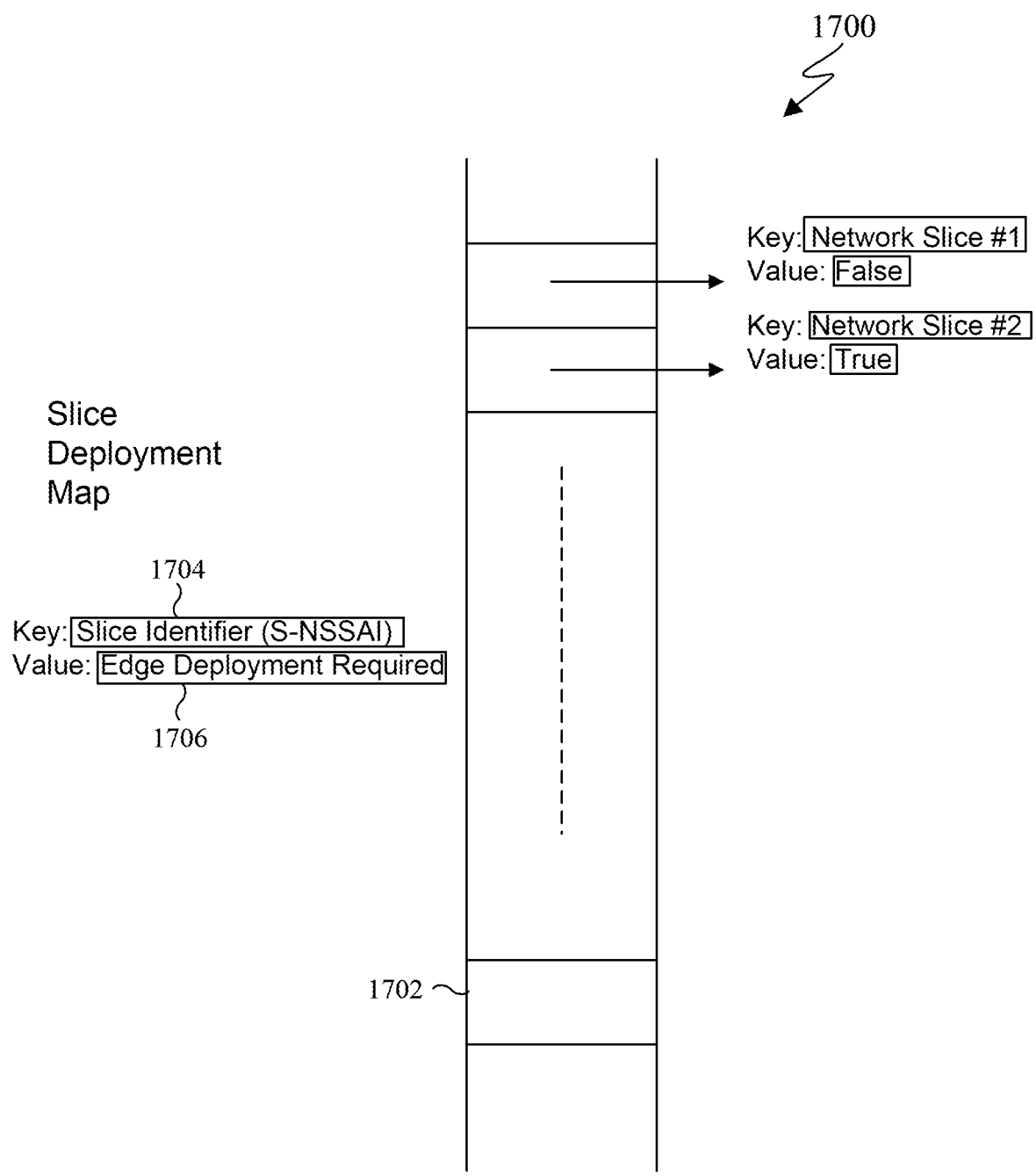
FIG. 17 illustrates an example network slice edge deployment map in accordance with this disclosure.

FIG. 17 illustrates an example network slice edge deployment map 1700 in accordance with this disclosure. The embodiment of the network slice edge deployment map 1700 illustrated in FIG. 17 is for illustration only. FIG. 17 does not limit the scope of this disclosure to any particular implementation of an electronic device.

Previously, a procedure is described where in during the realization of media communication service, certain network slices 728 are relocated to an edge network 406. In certain embodiments, a procedure is described where the external application service provider pre-determines the slides that need to be set in an edge network 406 because of the computational requirements of processing for each network slice 728.

To facilitate such provisioning, the provisioning API between the external application provider and the AF 722 (e.g., AF 722 as defined in 3GPP TS 26.501, per slice AF 722, media communication AF 1502, etc.) can be enhanced to include a network slice edge deployment map 1700 where in each entry 1702 of the map provides a mapping between a slice identifier 1406 (e.g., S-NSSAI) and an edge network deployment 1704 (e.g., a Boolean variable indicating whether to deploy network slice resources in an edge network or not).

Although FIG. 17 illustrates an example network slice edge deployment map 1700, various changes may be made to FIG. 17. For example, the number and placement of various components of the network slice edge deployment map 1700 can vary as needed or desired. In addition, the network slice edge deployment map 1700 may be used in any other suitable network slicing process and is not limited to the specific processes described above.

Figure 18A:
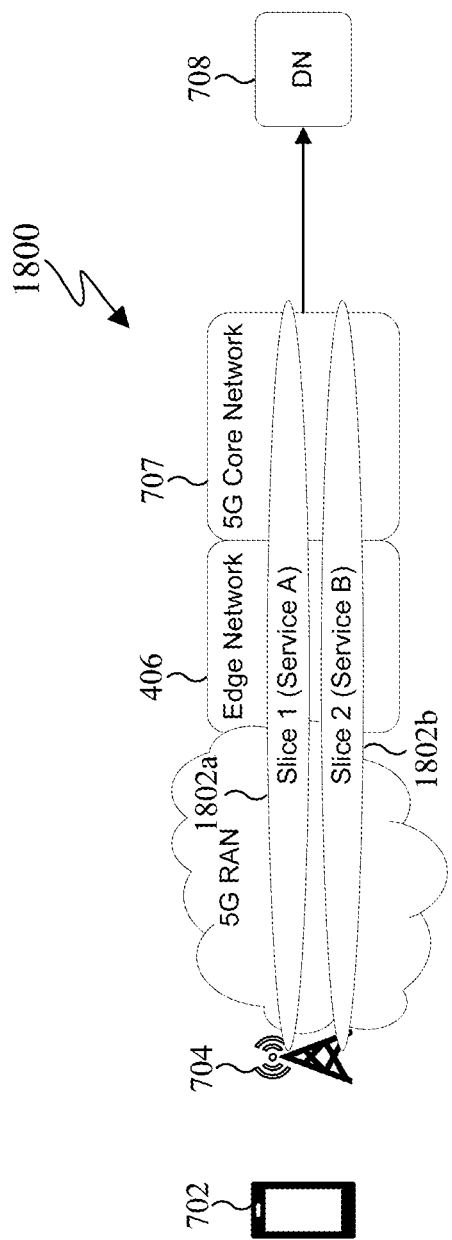
FIGS. 18A and 18B illustrate example architectures with edge networks shard by multiple slices in accordance with this disclosure.
Figure 18B:
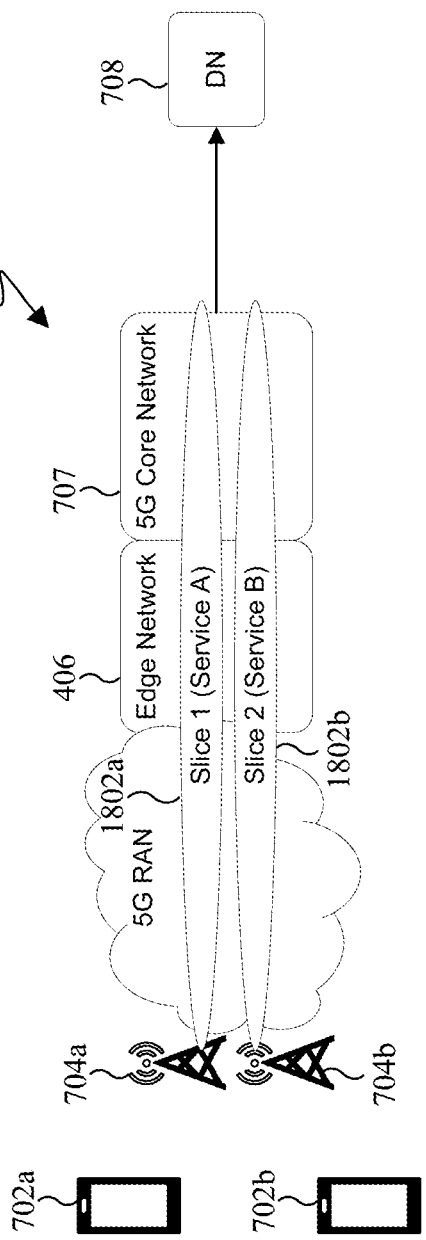

FIGS. 18A and 18B illustrate example architectures 1800, 1801 with edge networks 406 shard by multiple slices 728 in accordance with this disclosure. In particular, FIG. 18A illustrates example architecture 1800 with an edge network 406 shared by multiple network slices 728 for a same UE 702 and FIG. 18B illustrates architecture 1801 with an edge network 406 shared by multiple network slices 728 for multiple UEs 702. The embodiments of the architectures 1800, 1801 illustrated in FIGS. 18A and 18B are for illustration only. FIGS. 18A and 18B do not limit the scope of this disclosure to any particular implementation of an electronic device.

As shown in FIGS. 18A and 18B, to truly avail the benefits of both network slicing and edge computing, there is a need to build an architecture that can take advantage of both the enablers. However, 3GPP SA2, in TS 23.501, defines that a network slice instance only includes a core network control plane and user plane network functions, and, in the serving PLMMN, at least one of an NG-RAN described in TS 38.300, a N3IWF or TNGF functions to the non-3GPP Access Network, and a W-AGF function to the wireline access network. From the above, it is clear that the edge computing environments are not part of a network slice instance. This means that if edge computing is to be used in a network slicing environment, then edge compute resources are agnostic to network slices 728. Therefore, edge computing resources are shared by applications running in different network slices 728.

A first end-to-end network slice 1802*a* and a second end-to-end network slice 1802*b* are respectively running a first service A and a second service B that use the same edge network resources. In this deployment option, the first end-to-end network slice 1802*a* and the end-to-end network slice 1802*b* are end-to-end slices 1802 (network slice instances) running two different application services.

Although FIGS. 18A and 18B illustrate example architectures 1800, 1801 with edge networks 406 shard by multiple slices 728, various changes may be made to FIGS. 18A and 18B. For example, the number and placement of various components of the architectures 1800, 1801 can vary as needed or desired. In addition, the architectures 1800, 1801 may be used in any other suitable network slicing process and is not limited to the specific processes described above.

Figure 19:
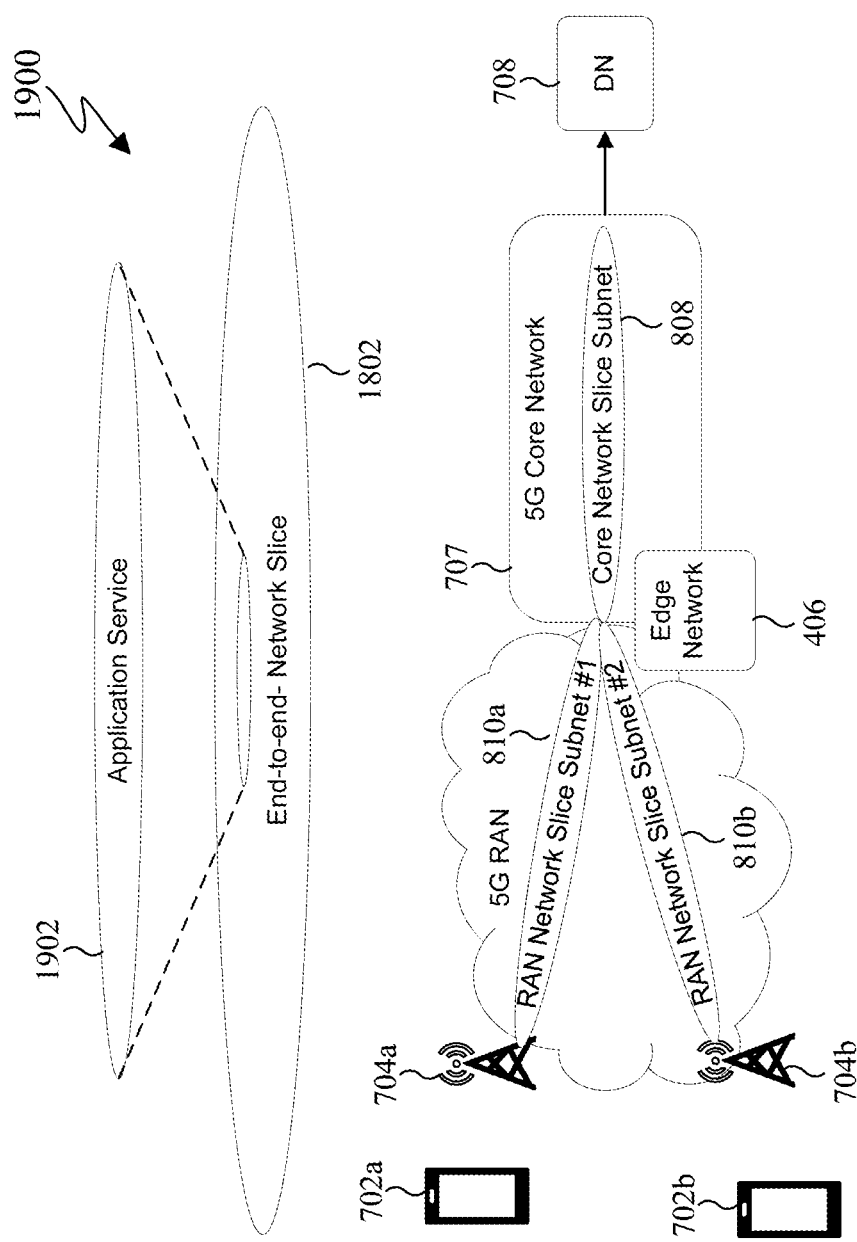
FIG. 19 illustrates an example architecture for an edge network shared by multiple network slice subnet instances in accordance with this disclosure.

FIG. 19 illustrates an example architecture 1900 for an edge network 406 shared by multiple network slice subnet instances 804 in accordance with this disclosure. The embodiment of the architecture 1900 illustrated in FIG. 19 is for illustration only. FIG. 19 does not limit the scope of this disclosure to any particular implementation of an electronic device.

As shown in FIG. 19, an application service 1902 can use the same NSSI CN 808, but two different RAN slice subnets, such as a first NSSI-AN 810*a* and a second NSSI-AN 810*b*. The application service 1902 runs in the same NSSI CN 808, but there are two different RAN slice subnets as the users beyond the gNBs 704 are subscribed to the same application service 1902, but since they are geographically far apart, there is a need for separate RAN slice subnets 810.

In both of the embodiments outlined above, edge network resources are shared by network slices instances 728 that could be running different application services 1902. If network slices 728 are provisioned for application services 1902, then it is possible that many application sessions could be operating within each network slice 728 as one network slice 728 may potentially support many application sessions (potentially millions of application sessions). This means that edge network resources provide support to many number of application sessions of different application services 1902.

If multiple application services 1902 are sharing the same edge network infrastructure and vying for resources, it is possible that an edge orchestration system, from time to time, have to prioritize certain applications from others. To support this aspect, edge service priorities have to be defined for each application service 1902 that can potentially be supported at a network edge. Application service providers 1102, while provisioning the application service 1902 at the AF 722, can indicate what the edge service priority is for the application service 1902. When multiple application services 1902 are vying for the same edge resources, the AF 722 can look at edge service priority to prioritize allocation of resources to that application service 1902.

When there are multiple application services 1902 with the same edge service priority, the edge orchestration manager is left to allocate resources for those competing application service 1902 but is performed based on configuration by the AF 722. The AF 722 may look at resource requirements of each application service 1902, and then evaluate which application service 1902 may gain the most upon edge resource allocation. The evaluation could be based on several aspects.

One aspect the evaluation could be based on is resource requirement of different application services 1902. With this option, application service 1902 that have lower resource requirements can be prioritized for resource allocation. This guarantees that such application services 1902 can complete before other application services 1902 with higher resource requirements.

Another aspect the evaluation could be based on is time to completion. With this option, if there are two competing application services 1902 with same priority, the application service 1902 that can be completed first can be allocated with the edge resources. This guarantees that there is no service buildup for shared edge resources. Time for completion of an application service 1902 may be attained using any of the following methods including provisioned by an application service provider, from an analytics function, etc. When the time for completion is provisioned by the application service provider, the application service provider can indicate to the AF 722 that is managing the application service 1902 of the expected service completion time of the application service 1902. The expected service completion time of the application service 1902 may be based on past history of the application service 1902. Such information could be obtained by the application service provider 1102 from an analytics service such as 3GPP NWDAF, or even a specialized analytics AF 722 in 3GPP network. When the time for completion is from an analytics function can be a 3GPP NWDAF or a specialized analytics AF function provisioned exclusively for such purposes.

Application services 1902 deployed in edge network 406 can be attributed with a set of resource parameters. This set of resource parameters constitute the resource profile for the application service 1902 delivered using an edge network 406, i.e. the edge service.

Examples of parameters for an edge service in the edge network 406 can include, but are not limited to, an environment field, a vCPUs field, a memory field, a disk field, a network-bandwidth field, a gpus field, a processor_type field, a processor architecture field, a storage type field, a processor cores field, an OS type field, a resource type field, an RDMA access field, a peer-to-peer GPU communication speed field, a security configuration field, a routing configuration field, a container environment field, a container reachability field, etc. The environment field can indicate the resource environment type. Possible values of the environment field can include a VM value, a container value, etc. The VM value can indicate that the resource environment is a virtual machine environment. In this type, all resources in an edge network that are assigned for the edge services are virtual machine type resources. The container value can indicate that the resource environment is a container environment. In this type, all resources in edge network 406 that are assigned for the edge services are container resources. The vCPUs field can indicate a number of virtual CPUs assigned to the edge service in the edge network 406. The memory field can indicate allocated memory to all application service instances of the edge service. The disk field cand indicate allocated disk storage to all application service instances of the edge service. The network-bandwidth field can indicate a typical network bandwidth between different application service components of the edge service in the edge network 406. The gpus field can indicate a number of GPUs assigned to the edge service in the edge network 406.

The processor_type field can indicate types of processors assigned to a process edge service. The processor architecture field can indicate a processor architecture using possible value such as x86, arm, x86_64, etc. The storage type field can indicate a storage type, such as HD, SSSD, etc. The processor cores field can indicate a number of processor cores for edge service. The OS type field can indicate a type of operating system installed at the edge service instance. The resource type field can indicate a type of resources, such as base metal, shared hosting, etc., at the edge service instance. The RDMA access field can indicate a type of RDMA access, such as NVIDIA GPUDirect, AMAZON EFA, etc., at the edge service instance. The peer-to-peer GPU communication speed field can indicate a communication speed between peer-to-peer GPUs.

The security configuration field can indicate a security configuration for edge service application components. The security configurations can include open ports for the edge service when deployed, firewall options for edge service application components, network access control lists that define authorization rules to access edge service applications. The routing configuration field can indicate routing configurations for edge service application components. The routing configurations can include deployment in public vs private networks, route traffic between Internet and edge service application component, connectivity aspects between application service components deployed in public network and private network. The container environment field can indicate a type of container environment, such as OpenStack, AWS container system, Azure container system, self-deployed container system, etc. The container reachability field can indicate a reachability of information when edge service components are deployed as containers in and edge network 406. Examples can include port forwarding information and container service that indicates endpoint information that is used to reach edge application components deployed as containers. Resource profile information as described above is maintained for all edge services in the edge network 406.

When delivering an application service 1902 through network edge and another service is provisioned with a higher service priority, edge resources allocated to the first service can be preempted and given to the second service with higher priority.

This resource preemption needs to be provisioned by the application service provider 1102 when an application service 1902 is provisioned. When the AF 722 that receives a service provisioning request sees that it needs edge deployment, the AF 722 can check with the edge orchestration manager for allocation of edge resources. If edge resources are currently unavailable, then the AF 722 can check with edge orchestration manager if there are currently allocated resources for application services 1902 with lower priority than the current application service 1902 for which resource allocation is sought. If the AF 722 finds such an application service 1902, then the resources allocated to the original service are preempted and can be allocated to the application service 1902 with higher priority.

Although FIG. 19 illustrates an example architecture 1900 for an edge network 406 shared by multiple network slice subnet instances 804, various changes may be made to FIG. 19. For example, the number and placement of various components of the architecture 1900 can vary as needed or desired. In addition, the architecture 1900 may be used in any other suitable network slicing process and is not limited to the specific processes described above.

Figure 20:
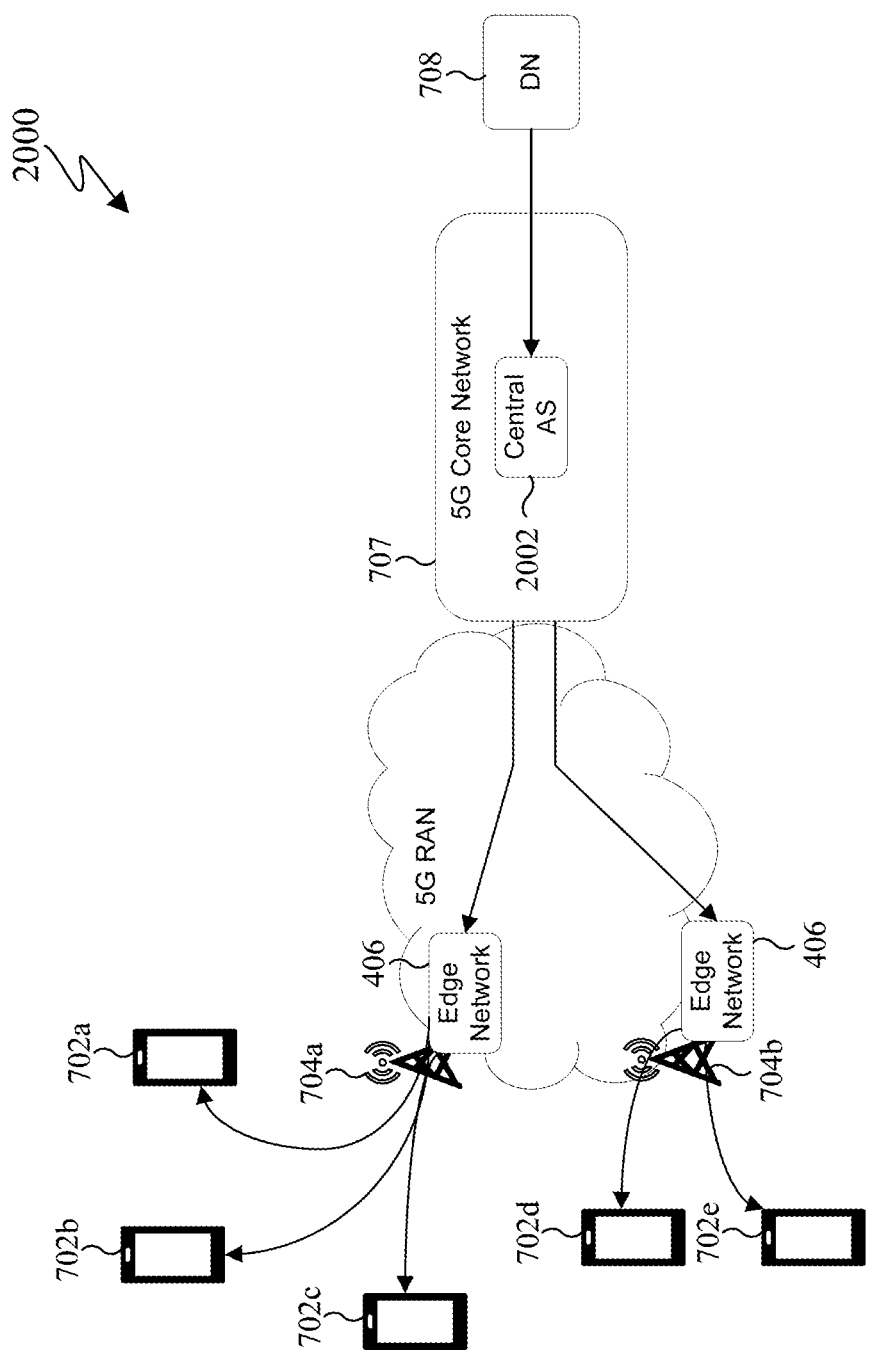
FIG. 20 illustrates an example multiple edge deployments for a single media service in accordance with this disclosure.

FIG. 20 illustrates an example multiple edge deployments 2000 for a single media service in accordance with this disclosure. The embodiment of the multiple edge deployments 2000 illustrated in FIG. 20 is for illustration only. FIG. 20 does not limit the scope of this disclosure to any particular implementation of an electronic device.

As shown in FIG. 20, an application service (e.g., a media service) can be provisioned to take advantage of edge network resources. In certain embodiments, content is ingested from external DN 708 to an edge network 406 and is optionally processed in the edge network 406 before distribution to end users, UE 702a-702e. Content can be ingested to a central AS 2002, as described in TS 26.501. Edge resources are provisioned for the service closer to gNBs 704 to take advantage of edge compute capabilities. Resources in different edge networks 406 process the content and distribute to UEs 702a-702e behind the respective gNB 704.

3GPP TS 26.501 discusses two network assistance facilities, in particular, throughput estimation and delivery boost. With the throughput estimation facility, network performs throughput estimation which allows the UE 702 to start a downlink streaming session at an appropriate bit rate for the network conditions at hand. The UE 702 can also perform throughput estimation based on its own measurement of incoming traffic. For the delivery boost, the UE 702 can indicate to the network that a temporary boost, i.e. a temporary increase in throughput would be needed in order to avoid risk of media playback stalling. When a downlink media streaming service is delivered to many users based on architecture shown in FIG. 20, every UE 702 receiving the stream can be performing both the actions of estimating throughput based on measurements of incoming traffic and estimating throughput to avoid risk of media playback calling.

As media service traffic is delivered to different UEs 702 at different bit rates and throughput as network conditions are different for different users (e.g., a set of UEs 702 behind a gNB 704 could be suffering additional network latencies because of which the throughput could be suffering), it is feasible that a distributed learning mechanism can help the UEs 702 adopt to changing network conditions. To provide this feature, scaling of edge resources might be needed to balance out the effect for improper network conditions.

If Thpt=f $(R_p)$, i.e. if downlink stream throughput is a function of edge service resource profile Rp, then the throughput can be based at different times because of network conditions. When all of the UEs 702 of the service are receiving traffic from edge-based servers at $T_0$, the resource profile is Thpt=f $(R_{p0})$, i.e. resource profile of edge resources at time $T_0$. When one or fewer UEs 702 start seeing throughput degradation at $T_1$, the resource profile is Thpt=f $(R_{p1})$, i.e. resource profile of edge resources at time $T_1$. When resources in the edge network 406 are enhanced to support adequate throughput to user at $T_0$, the resource profile is Thpt=f $(R_{p2})$, i.e. resource profile of edge resources at time $T_2$ when resources are scaled to support required throughput to UEs 702.

Given the above resource-profiles at different times for producing the respective throughput at the UEs 702, then the change in resource profile $\Delta R = R_{p2} - R_{p1}$, should be observed. A change in resource profile should be observed given throughput estimation assistance information from the UE at one of the edge locations at times $T_2$ and $T_1$ respectively. The edge resources can be scaled up for an updated throughput request from the UE 702. In this case, $\Delta R$ is positive giving increase in demand for throughput. In the same way, when the network conditions get better, the edge network 406 may need not have as much resource-profile, so the resources allocated to the edge service can be scaled down. In this case, the resources are scaled down with $\Delta R$ being negative.

If the information above is collected for different edge locations, then it can be learned using inference techniques such as Logistic Regression, the expected throughput for any resource profile at any given location. Once this information is predicted, then the edge network resources for an expected network condition can be pre-scaled even before the network condition occurs, thereby scaling edge network resources automatically.

In addition, if network conditions are observed at edge location $E_i$, because of which there is a drop off in Per-UE throughput, then other closer locations (e.g., geographically closer, service wise close—i.e. could be geographically far but have strong service SLA relationships) can use $\Delta R$ at edge location $E_j$ to adjust the resource profile at their own locations. For edge location $E_j$ closer to location $E_i$ for $I \neq j$ and if $\Delta R$ is change in resource profile at location $E_i$ at time $T_N$, then $\Delta R$ at $E_j$=f ($\Delta R$ at $E_i$). The scale up/down of resources at location $E_j$ is a function of scale up/down of resources at location $E_i$. The function f( ) could be a linear function, a match function, a logarithmic function, an exponential function, etc. The linear function can indicate a linear increase or decrease in edge resources at $E_i$ based on a linear increase or decrease of resources at location $E_j$. The increase or decrease is based on a number of UEs 702 behind the edge location or number of sessions that are being serviced through the edge location. For example, if there is a 5% scale up in Edge location $E_i$ that is serving "N" number of sessions, then for an Edge location $E_j$ servicing "2N" number of sessions, scale up by 10% (i.e. 2×5%). Similarly, if there is a 5% scale up in Edge location $E_i$ that is serving "N" number of users, then for an Edge location $E_j$ servicing "2N" number of users, scale up by 10% (i.e. 2×5%). A linear increase helps in scaling up enough resources at location Ej so it can be prepared for similar conditions that may arise.

The match function can indicate a match of a number of resources in $E_j$ compared to that in location $E_i$ irrespective of number of UEs 702 or sessions the edge locations are processing. The logarithmic function can indicate a logarithmic increase or decrease in edge resources at $E_j$ based on increase or decrease of resources at location $E_i$. The increase or decrease is based on number of UEs 702 behind an edge location or number of sessions that are being serviced through the edge location. The logarithmic increase helps in slowly scaling up resources at location $E_j$ so it can be little better prepared for similar conditions that may arise. The exponential function can indicate an exponential increase or decrease in edge resources at $E_j$ based on increase or decrease of resources at location $E_i$. The increase or decrease is based on number of UEs 702 behind the edge location or number of sessions that are being serviced through the edge location. Exponential increase helps in quickly scaling up resources at location $E_j$ so it can be at most prepared for similar conditions that may arise.

The type of function to use for resource scaling at other locations can be provisioned by the application service provider. The scale up or down of resources at edge locations can be performed by a central AF managing the media service, an AF deployed at an edge location, etc. The central AF can inform the edge application orchestration manager to scale up or down the resources allocated to the media service. The orchestration manager could be a separate AF 722 provisioned for managing edge media application service resources or a hardware orchestration entity. The AF 722 in each edge location can receive the scale-up or down information from AFs 722 deployed in other edge locations to do their own local scaling of resources for the media service.

In order to provide efficient sharing of resource profile information and offered throughput for a media service, a central database can be constituted that all edge locations can access. Resource profile information for each edge service can be persisted in this database along with how much throughput the media service is able to guarantee to the end users. This database can be queried by all edge locations to update their resource profile parameters instead of receiving this information from other edge locations.

A procedure has been described where in edge service resource parameters are optimized using application throughput information from the end user or the network inferred client throughput. In an alternative embodiment, edge service resources can be optimally allocated by measuring different SLA parameters for the media service instead of just relying alone on throughput. Parameters that can be measured and inferred to assist with edge service resource allocation can include a number of SLA parameters described in TS 28.552, TS 28.554, Application parameters listed in TS 28.531, and slice level parameters. The core slice subnet and RAN slice subnet parameters can be provisioned, measured, and predicted similar to application throughput (as described in main embodiment).

Some of the parameters mentioned above can be measured in the network, and the remaining are measured in the client. The parameters measured in the client can be informed to the network (e.g., the AF managing the media service) using the M5 interface. Interface enhancements are added to the M5 interface can include an application reporting type field and a report field. The application reporting type field can indicate a type of report, e.g. an application report, a network statistics report, etc. The report field can indicate an actual report with measurement data. The report could include one or more than one parameter that are being reported. Each parameter can include a param-name value for a name of an application parameter being reported, a param-value value that is a value of an application parameter, a measurement time that is a time the parameter was measured, and a measurement-renewal-interval that is an interval after which the parameter will be measured again.

Optionally, mechanisms listed in TS 28.531 can be used by the UE 702 to report application parameter measurements. Alternative, other analytics function such as 3GPP NWDAF can be used to retrieve measurements and predictions.

Parameter information measured in the network or collected from the UE 702 can be persisted in the central database. This information can then be used to predict the edge service resource profile information that can be relayed to all edge service locations which can then scale up or down the resources allocated to each media service. The type of parameters for measurement and prediction can be configured by the application service provider.

A procedure where in optimum resource parameters in an edge location for an application service are learned using AI and machine learning algorithms for one parameter—throughput has been previously described. This method can be extended for a number of parameters described earlier in the disclosure. A parameter collection can be constructed for different parameters. The parameter collection can include a parameter name field, a change in resource allocation per N UE per session field, a confidence field, etc. The parameter name field can indicate a name of a parameter that is measured and predicted for optimum resource allocation information. The change in resource allocation per N UE per session field can indicate information about a change in resource profile information because of the parameter "N" of UEs 702 or "N" number of media sessions. This method is similar to the disclosure related to the "throughput" parameter. The confidence field indicates the confidence information about the prediction.

The above parameter collection can be built at each of the edge location and shared with other edge locations. Alternatively, this information can be persisted in a shared central database so it can be read by all the edge locations.

The 5G application service provider, when provisions the service at the 5G AF (e.g., using the M1 interface), can specify aspects related to shared network edge for that service. To facilitate shared network edge, the M1d interface can be enhanced to include the following information elements including an edge-service priority field, an edge-service-priority-evaluation-method field, a service-completion time field, a resource-preemption field, a parameter-measurement-interval field, a range field, a scale-function field, a scale-function-override field, an enforcing entity field, a require-central-db field, a no-of-UEs-for-inference-validity field, a no-of-session-for-inference-validity field, a parameter-priority-map field, etc.

The edge-service priority field can indicate priority of service when edge deployment is sought. A value for the edge-service priority field can range between 0-100 with a lower value indicating a higher priority. The edge-service-priority-evaluation-method field can include information that indicates how to resolves resource allocation issues if there are edge services with similar priorities. Possible value can include a lower resource requirement where services with lower resource requirements are given priority before services with higher resource requirements and shorter-time-to-completion where services with shorter time to completion are given priority before services with higher time to completion. The service-completion time field can indicate an expected running time of a service. The resource-preemption field can be represented by a Boolean value indicating whether resource preemption is supported based on edge-service-priority. The Boolean value can be set to "True" when resource preemption is allowed for this service and set to "False" when resource preemption is not allowed for this service. If the value is set to True as part of service provisioning, then the resources allocated to this service can be preempted when another service with higher priority requests for edge resources. If the value is set to False as part of service provisioning, then the resources allocated to this service cannot be preempted when another service with higher priority requests for edge resources.

The parameter-measurement-interval field can indicate an interval at which parameters are measured, either by client reporting or network measurement taken. The range field can indicate an area around which the statistics/prediction from an edge-network is applicable. Beyond a certain area, the inference information may not mean much in terms of using that prediction information. The scale-function field can indicate a scaling function to use to scale resources in an edge network 406 based on information received from other edge network. The scale-function-override field can be represented by a Boolean variable indicating if the scaling function can be overridden by the scale function enforcing entity. The Boolean variable can be set to "True" for overriding the scaling function and "False" for when the scaling function cannot be overridden. If the scaling function is set to True, the enforcing entity can override the scaling function configured by the application service provider. If the scaling function is set to False, the enforcing entity cannot override the scaling function configured by the application service provider. In this case, the scaling function has to followed regardless of what the inference information depicts the situation to be.

The enforcing entity field can indicate an entity that uses the information from another edge network 406 to update resource profile of current edge network 406. The require-central-db field can be represented by a Boolean variable indicating whether a central db can be used for persisting statistics and prediction information. The Boolean variable can be set to "True" when the central database is to be used to persist statistics or inference information and set to "False" when the central database cannot be used to persist statistics or inference information. If the value of this variable is set to True, then this indicates that the application service provider intends that the network operator provision a central database where information from all the edge networks 406 can be persisted. The network operator shall provision a central database and inform the application service provider the endpoint details of the provisioned central database. The no-of-UEs-for-inference-validity field can indicate information about number of UEs to be available before inference from the edge network 406 to be valid. The no-of-session-for-inference-validity field can indicate information about number of UE sessions to be available before inference from the edge network 406 to be valid. The parameter-priority-map field can be represented by a map of parameters with a key, value pair. The key represents the parameter to be measured/predicted, and the value field represents the priority of the parameter to be used while using the inference information about that parameter. If there are multiple parameters that are collected for measurement/prediction, the priority of the parameters can be used for deciding information from which parameter to prioritize.

The N5 Interface 508, as shown in FIG. 5, as the interface between 5GMSd AF 518 and PCF 506. The information available to the AF 518 based on all the methods described in this disclosure can result in resource scaling for the edge services using a policy update procedure sent from the AF 518 to the PCF 506 using the N5 interface 508. In certain embodiments, the 3GPP NWDAF can obtain this information from AF 518 through NEF using a network layer service-based interface. Optionally, OSS/BSS functions such as CSMF, NSMF, NSSMF (as discussed in TS 28.530, 28.531, 28.532, 28.545, 28.550) can collect information from 3GPP control plane elements such as PCF 506, NWDAF, AF 518 to receive information about resource scaling information specified in this disclosure. If the OSS/BSS systems collect such information, they can send the information to resource orchestration managers using the OS-Ma-Nfvo interface as described in ETSI GS NFV-IFA 013 standard.

Any of the above interfaces described above can be enhanced to include the following information about resource scaling information including a service-id field, a preempt resources category field, a preempt-resources-of-services field, a scaling-factor field, a scaling function field, etc. The service-id field can indicate service identification information using which service flows can be identified in the 3GPP system. The preempt resources category field can indicate a category of resources for the given service that can be preempted upon such decision. The preempt-resources-of-services field can indicate a list of service identifiers whose resources can be preempted to allocate resources for this service. The scaling-factor field can indicate a scaling factor to scale the resource profile. The scaling function field can indicate a scaling function to use to scale the resource allocation for this service.

Although FIG. 20 illustrates an example multiple edge deployments 2000 for a single media service, various changes may be made to FIG. 20. For example, the number and placement of various components of the multiple edge deployments 2000 can vary as needed or desired. In addition, the multiple edge deployments 2000 may be used in any other suitable network slicing process and is not limited to the specific processes described above.

Figure 21:
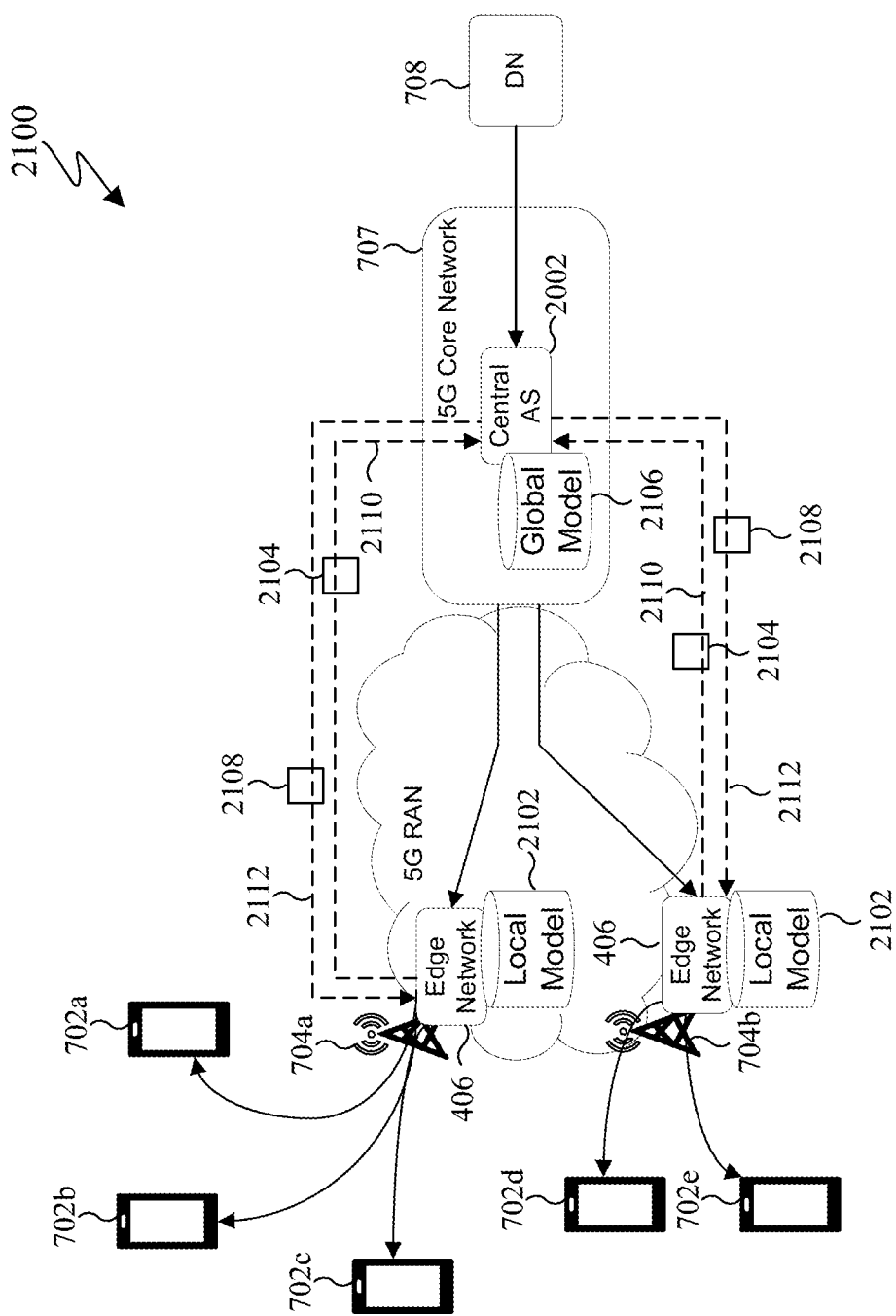
FIG. 21 illustrates an example architecture 2100 for federated learning for quick learning of resource parameters in accordance with this disclosure.

FIG. 21 illustrates an example architecture 2100 for federated learning for quick learning of resource parameters in accordance with this disclosure. The embodiment of the architecture 2100 illustrated in FIG. 21 is for illustration only. FIG. 21 does not limit the scope of this disclosure to any particular implementation of an electronic device.

As shown in FIG. 21, an AI-assisted method is described where in different edge networks 406 exchange resource scale-in or scale-out information and the change in resource profile information to support optimization of allocated resources for edge media services. In certain embodiments, a federated learning mechanism is used for optimizing resource allocation at any given time to a service in any edge service location.

Each edge location can train local AI models based on the traffic for media service going through the edge network 406. Based on the number of sessions and UEs 402a-402e accessing traffic belonging to a media service, the model parameters can be trained and tuned. The model parameters represent the number of resources for each resource parameter of the edge service resource profile.

When local models 2102 are trained at different edge locations, the local model parameters 2104 can be shared with a global application service (e.g., the central AS 2002 shown in FIG. 20) in step 2110. Since the global application service is also seeing the media service traffic, the global application service can prepare and optimize a global AI model based on all the local models received from all edge locations.

In certain embodiments, the global application service can also share the global AI model to each of the edge locations that is taking part in distributing media service traffic to end users. Each of the edge location can optimize their local model with the information received from the global model 2106 to quickly learn the optimum parameters for resource allocation in their local edge networks 406.

In addition, the central database can be enhanced to persist local model parameter 2104 and global model parameters 2108. Each edge location, instead of receiving the global model parameters 2108 from the central application service 2002, can instead receive that information from the central database in step 2112. Similarly, each edge location, instead of sending local model parameters 2104 to the central application service, can instead persist their local model information to the central database, which can then be accessed by the central application service 2002 or other edge locations to optimize their resource profile parameters.

In addition to the above learning mechanism, the parameter collection information built at each edge location can also be exchanged and used for federated learning. Different edge locations can update their local learning of parameter collection with similar information received from other edge locations. Optionally, the local parameter collection information can be used to update a global parameter collection information so it can then be used to optimize resource parameters across all parameters in all edge locations. The local model information at each edge location can hold the parameter collection information described earlier in the disclosure.

Although FIG. 21 illustrates an architecture 2100 for federated learning for quick learning of resource parameters, various changes may be made to FIG. 21. For example, the number and placement of various components of the architecture 2100 can vary as needed or desired. In addition, the architecture 2100 may be used in any other suitable network slicing process and is not limited to the specific processes described above.

Figure 22:
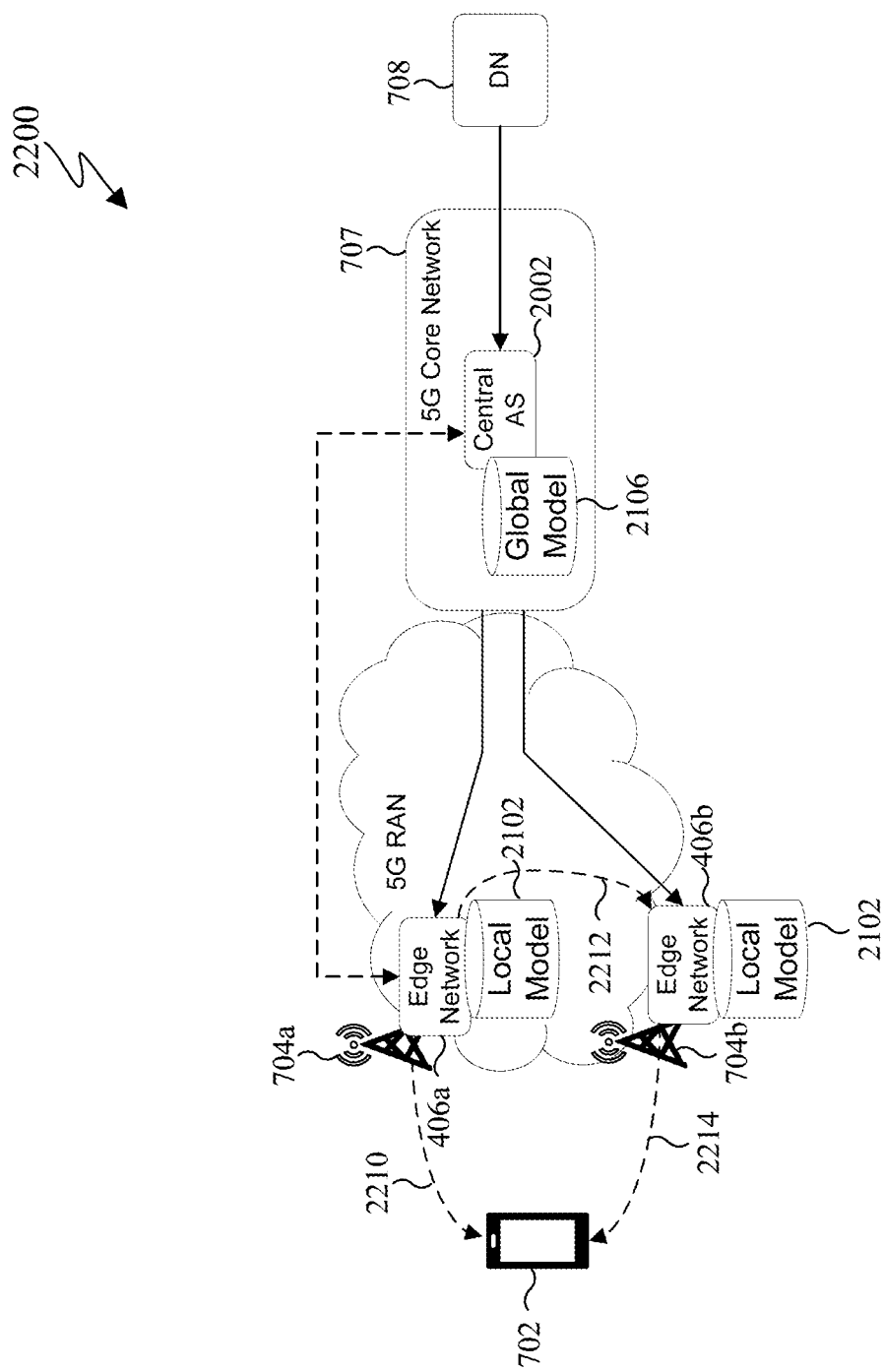
FIG. 22 illustrates an example architecture for a service relocation based on a resource profile inference in accordance with this disclosure.

FIG. 22 illustrates an example architecture 2200 for a service relocation based on a resource profile inference in accordance with this disclosure. The embodiment of the architecture 2200 illustrated in FIG. 22 is for illustration only. FIG. 22 does not limit the scope of this disclosure to any particular implementation of an electronic device.

In certain embodiments, method is described for inferring optimum resource profile information for one or more parameters. In addition to using this information for resource allocation, the same information can be used for service relocation from one edge network 406 to other edge network 406 or to the 5G core network 707.

As shown in FIG. 22, when a UE 702 is receiving a service from a first edge network 406*a* in step 2210, resource profile information can be inferred for one or more parameters, and sufficient resources are unavailable or cannot be allocated for the media service, then the service resources can be relocated to a different edge location in step 2212, and the UE 702 can be served from the other edge network 406 in step 2214.

As shown in FIG. 22, The media service resources can provide service from a first edge network 406*a* to the UE 702. Because of parameter inference, a decision is made to relocate service resources to a different edge location because additional resources cannot be allocated as predicted using parameter inference. The media service can be provided from a second edge network 406*b* to the UE 702.

Although FIG. 22 illustrates an example architecture 2200 for a service relocation based on a resource profile inference, various changes may be made to FIG. 22. For example, the number and placement of various components of the architecture 2200 can vary as needed or desired. In addition, the architecture 2200 may be used in any other suitable network slicing process and is not limited to the specific processes described above.

Figure 23:
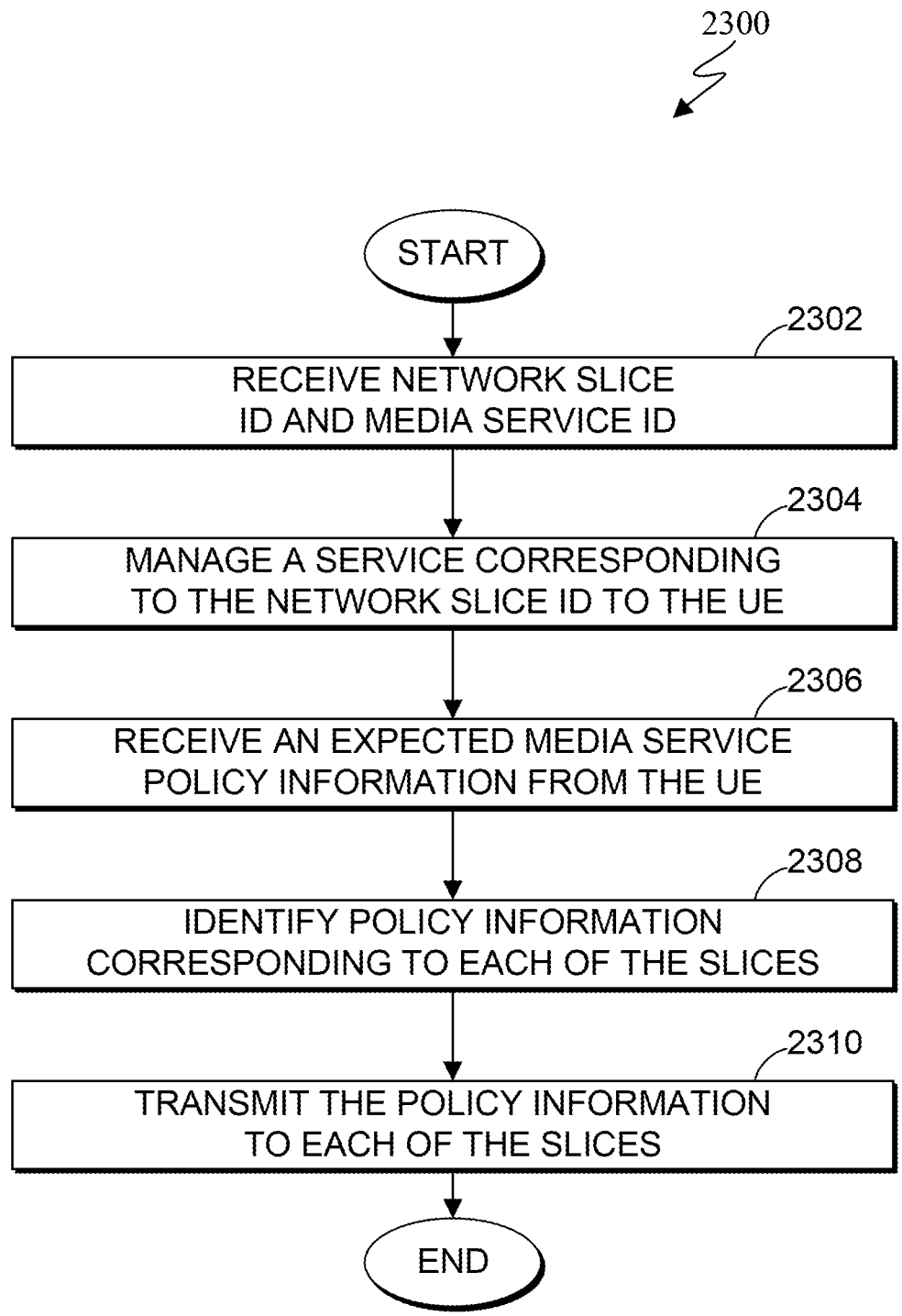
FIG. 23 illustrates an example method for realizing media communication services using network slicing according to this disclosure.

FIG. 23 illustrates an example method 2300 for realizing media communication services using network slicing according to this disclosure. For ease of explanation, the method 2300 of FIG. 23 is described as being performed using the AF 722 of FIG. 7. However, the method 2300 may be used with any other suitable system and any other suitable electronic device.

As shown in FIG. 23, the AF 722 can receive a network slice identification and a media service identification at step 2302.

The AF 722 can manage a service corresponding to the network slice ID to the UE 702 at step 2304. In particular, the AF 722 can receive, via the communication interface, network slice identification and media service identification across slices for a media service.

The AF 722 can receive an expected media service policy information from the UE 702 at step 2306. In particular, the AF 722 can receive, via the communication interface, expected media service policy information from the UE.

The AF 722 can identify policy information corresponding to each of the slices at step 2308. The AF 722 can identify policy information corresponding to each of the slices, respectively. The expected media service policy information includes multiple parameters, and the updated slice parameters are based on analysis of the multiple parameters.

The AF 722 can transmit, via the communication interface, slice metrics of a respective slice to a network data analytics function. The AF 722 can receive, via the communication interface, updated slice parameters based on an analysis of slice metrics corresponding to the respective slice. The updated slice parameters update media communication service parameters. The slice metrics for each slice are measured individually and a quality of service enhanced for a slice that is performing below a threshold.

The AF 722 can receive, via the communication interface, an indication that a core network is not capable of a quality of service indicated by the UE. In certain embodiments, the AF 722 can reallocate partial capability of a network slice to an edge resource from the core network. In certain embodiments, the AF 722 can fully relocate network slice to an edge network 406 from the core network.

The AF 722 can transmit the policy information to each of the network slices at step 2310. In particular, the AF 722 can transmit, via the communication interface, the policy information corresponding to each of the slices, respectively.

The AF 722 can receive, via the communication interface, feedback from the UE about throughput estimation. The AF can update a resource allocation for each of the slices based on the feedback. When the service is distributed between multiple edge networks 406, the AF 722 learn at one edge network 406 and use a scaling function to scale resources for each of the multiple edge networks 406. The scaling function can be based on at least one of a number of UE sessions, a time of day, and a location.

Although FIG. 23 illustrates one example of a method 2300 for realizing media communication services using network slicing, various changes may be made to FIG. 23. For example, while shown as a series of steps, various steps in FIG. 23 may overlap, occur in parallel, or occur any number of times.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. An apparatus for an application function (AF), the apparatus comprising:
   a communication interface; and
   a processor operably coupled to the communication interface, the processor configured to:
      receive, via the communication interface, network slice identification and media service identification across slices for a media service;
      manage a service corresponding to the network slice identification to a user equipment (UE);
      receive, via the communication interface, expected media service policy information from the UE;
      identify policy information corresponding to each of the slices, respectively; and
      transmit, via the communication interface, the policy information corresponding to each of the slices, respectively.

2. The apparatus of claim 1, wherein the processor is further configured to:
   transmit, via the communication interface, slice metrics of a respective slice to a network data analytics function; and
   receive, via the communication interface, updated slice parameters based on an analysis of slice metrics corresponding to the respective slice.

3. The apparatus of claim 2, wherein the updated slice parameters update media communication service parameters.

4. The apparatus of claim 3, wherein the slice metrics for each slice are measured individually and a quality of service enhanced for a slice that is performing below a threshold.

5. The apparatus of claim 2, wherein:
   the expected media service policy information includes multiple parameters, and
   the updated slice parameters are based on analysis of the multiple parameters.

6. The apparatus of claim 1, wherein the processor is further configured to:
   receive, via the communication interface, an indication that a core network is not capable of a quality of service indicated by the UE; and
   reallocate partial capability of a network slice to an edge resource from the core network.

7. The apparatus of claim 1, wherein the processor is further configured to:
   receive, via the communication interface, an indication that a core network is not capable of a quality of service indicated by the UE; and
   relocate network slice to an edge network from the core network.

8. The apparatus of claim 1, wherein the processor is further configured to:
   receive, via the communication interface, feedback from the UE about throughput estimation; and
   update a resource allocation for each of the slices based on the feedback.

9. The apparatus of claim 8, wherein the processor is further configured to, when the service is distributed between multiple edge networks, learn at one edge network and use a scaling function to scale resources for each of the multiple edge networks.

10. The apparatus of claim 9, wherein the scaling function is based on at least one of a number of UE sessions, a time of day, and a location.

11. A method for an application function comprising:
    receiving, via a communication interface, network slice identification and media service identification across slices for a media service;
    managing, using a processor operably coupled to the communication interface, a service corresponding to the network slice identification to a user equipment (UE);
    receiving, via the communication interface, expected media service policy information from the UE;
    identifying, using the processor, policy information corresponding to each of the slices, respectively; and
    transmitting, via the communication interface, the policy information corresponding to each of the slices to slices, respectively.

12. The method of claim 11, further comprising:
    transmitting, via the communication interface, slice metrics of a respective slice to a network data analytics function; and
    receiving, via the communication interface, updated slice parameters based on an analysis of slice metrics corresponding to the respective slice.

13. The method of claim 12, wherein the updated slice parameters update media communication service parameters.

14. The method of claim 13, wherein the slice metrics for each slice are measured individually and a quality of service enhanced for a slice that is performing below a threshold.

15. The method of claim 12, wherein:
    the expected media service policy information includes multiple parameters, and
    the updated slice parameters are based on analysis of the multiple parameters.

16. The method of claim 11, further comprising:
    receiving, via the communication interface, an indication that a core network is not capable of a quality of service indicated by the UE; and
    reallocating partial capability of a network slice to an edge resource from the core network.

17. The method of claim 11, further comprising:
    receiving, via the communication interface, an indication that a core network is not capable of a quality of service indicated by the UE; and
    relocating network slice to an edge network from the core network.

18. The method of claim 11, further comprising:
    receiving, via the communication interface, feedback from the UE about throughput estimation; and
    updating a resource allocation for each of the slices based on the feedback.

19. The method of claim 18, further comprising, when the service is distributed between multiple edge networks, learning at one edge network and using a scaling function to scale resources for each of the multiple edge networks.

20. The method of claim 19, wherein the scaling function is based on at least one of a number of UE sessions, a time of day, and a location.

* * * * *